United States Patent [19]

Hau et al.

[11] Patent Number: 5,587,742
[45] Date of Patent: Dec. 24, 1996

[54] FLEXIBLE PARALLEL PROCESSING ARCHITECTURE FOR VIDEO RESIZING

[75] Inventors: Clarence J.-Y. Hau, Mt. Laurel; Kevin J. Stec, Medford; Kenneth E. Vavreck, Maple Shade, all of N.J.

[73] Assignee: Panasonic Technologies, Inc., Princeton, N.J.

[21] Appl. No.: 519,437

[22] Filed: Aug. 25, 1995

[51] Int. Cl.$^6$ ............................................. H04N 7/01
[52] U.S. Cl. ................................. 348/441; 348/718
[58] Field of Search .................................. 348/441, 443, 348/445, 718; 364/724.1; 346/580, 581; H04N 7/01, 9/64

[56] References Cited

U.S. PATENT DOCUMENTS

| | | |
|---|---|---|
| 4,468,688 | 8/1984 | Gabriel et al. . |
| 4,472,732 | 9/1984 | Bennett et al. . |
| 4,485,402 | 11/1984 | Searby ................................. 348/718 |
| 4,631,750 | 12/1986 | Gabriel et al. . |
| 4,652,908 | 3/1987 | Fling et al. . |
| 4,774,581 | 9/1988 | Shiratsuchi . |
| 4,812,099 | 3/1989 | Hedley et al. ........................ 348/718 |
| 4,908,874 | 3/1990 | Gabriel . |
| 5,057,911 | 10/1991 | Stec et al. . |
| 5,274,372 | 12/1993 | Luthra et al. . |
| 5,327,235 | 7/1994 | Richards . |
| 5,331,346 | 7/1994 | Shields et al. . |
| 5,389,923 | 2/1995 | Iwata et al. . |

*Primary Examiner*—Victor R. Kostak
*Attorney, Agent, or Firm*—Ratner & Prestia

[57] ABSTRACT

A system for converting a digital input signal having a vertical and horizontal dimension into a digital output signal having a different horizontal and vertical dimension than that of the digital input signal. The digital input signal is fed into a first memory which stores the input signal. A horizontal resampling filter is used for converting the horizontal dimension of the digital input signal to the horizontal dimension of the desired output signal. The output from the horizontal resampling filter is transposed so that the vertical dimension of the output signal is oriented in a horizontal orientation. The transposed signal is then stored in a second memory. The transposed signal with the resampled horizontal dimension from the second memory is fed into a vertical resampling filter which converts the vertical dimension information of the transposed signal to the desired format of the output signal. This vertically resampled signal is then transposed so that the horizontal and vertical dimensions are oriented like that of the digital input signal. The re-tranposed signal is then stored in a third memory as the digital output signal.

14 Claims, 19 Drawing Sheets

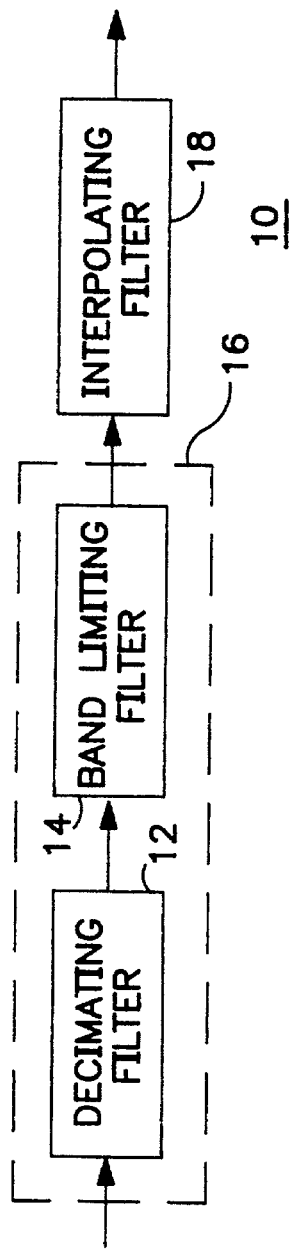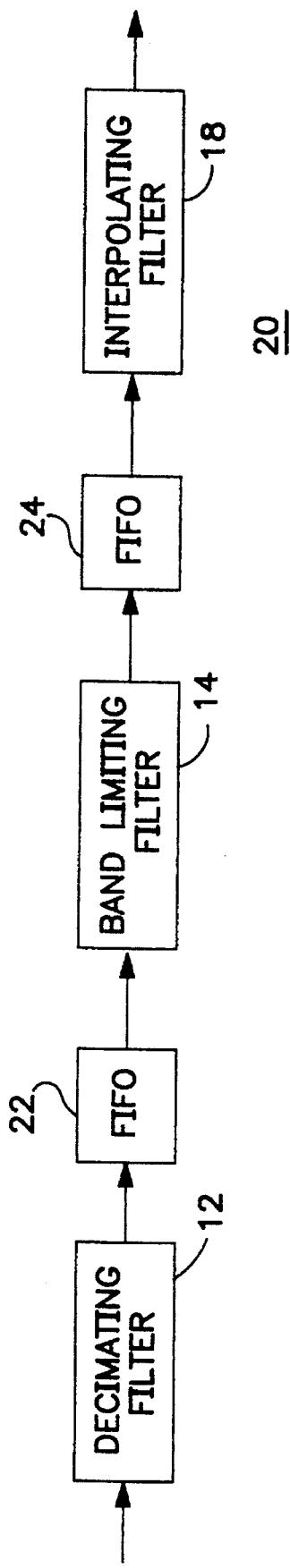
FIG. 1
FIG. 2

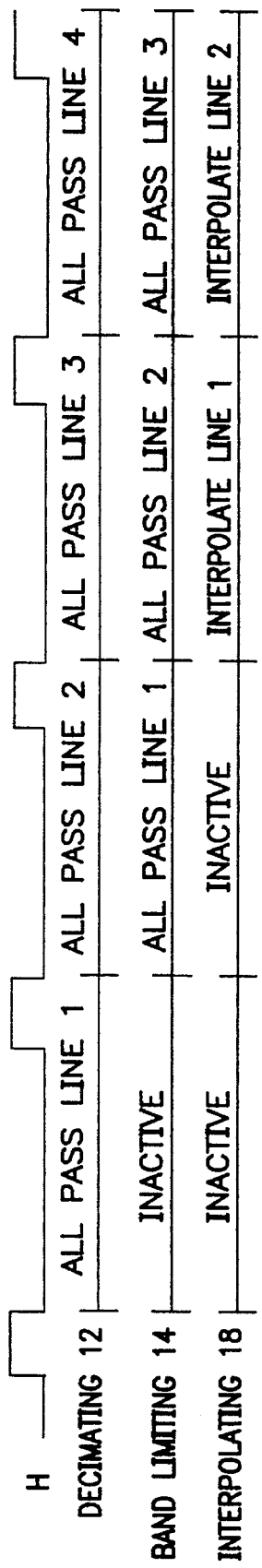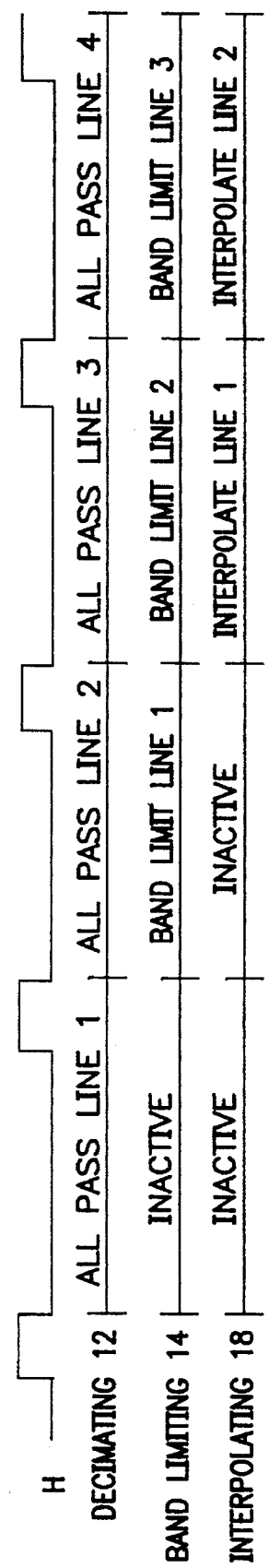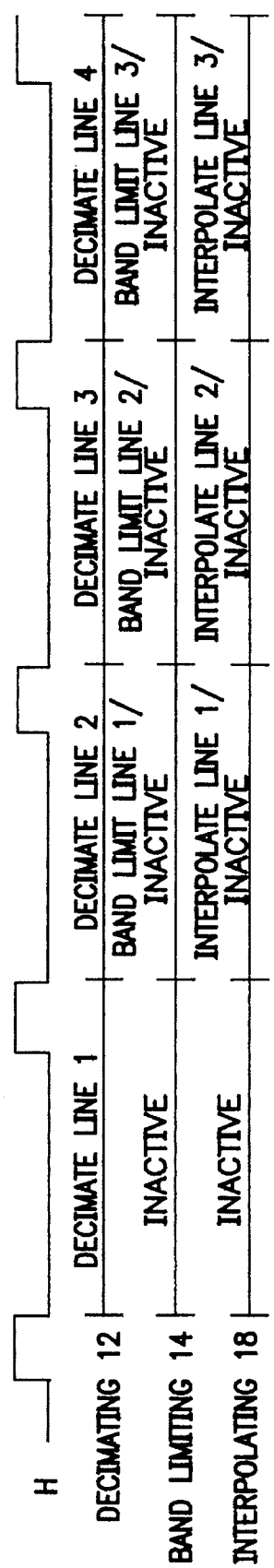
FIG. 4A
FIG. 4B
FIG. 4C

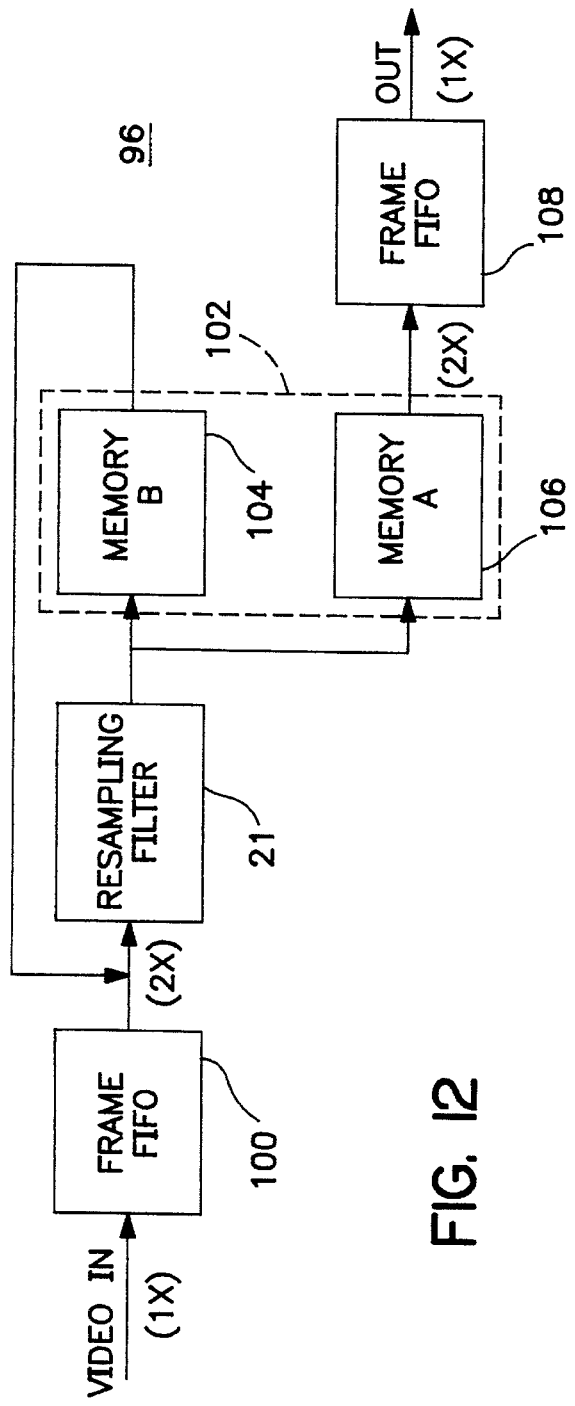
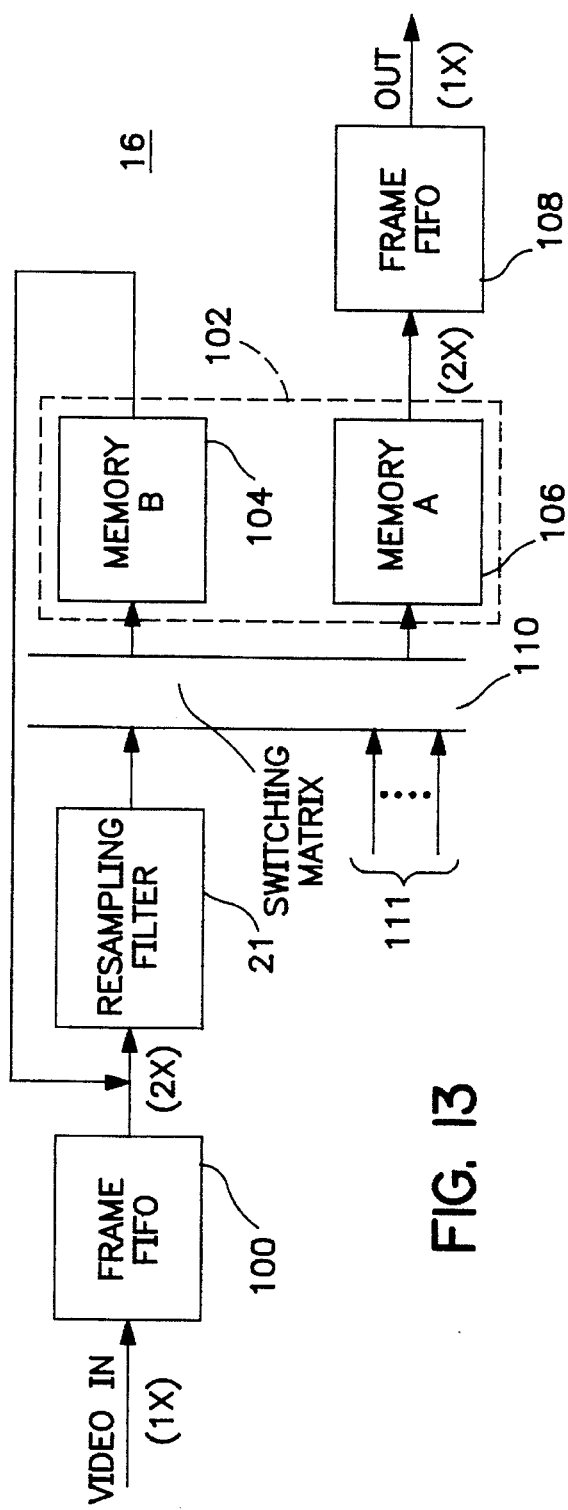
FIG. 12
FIG. 13

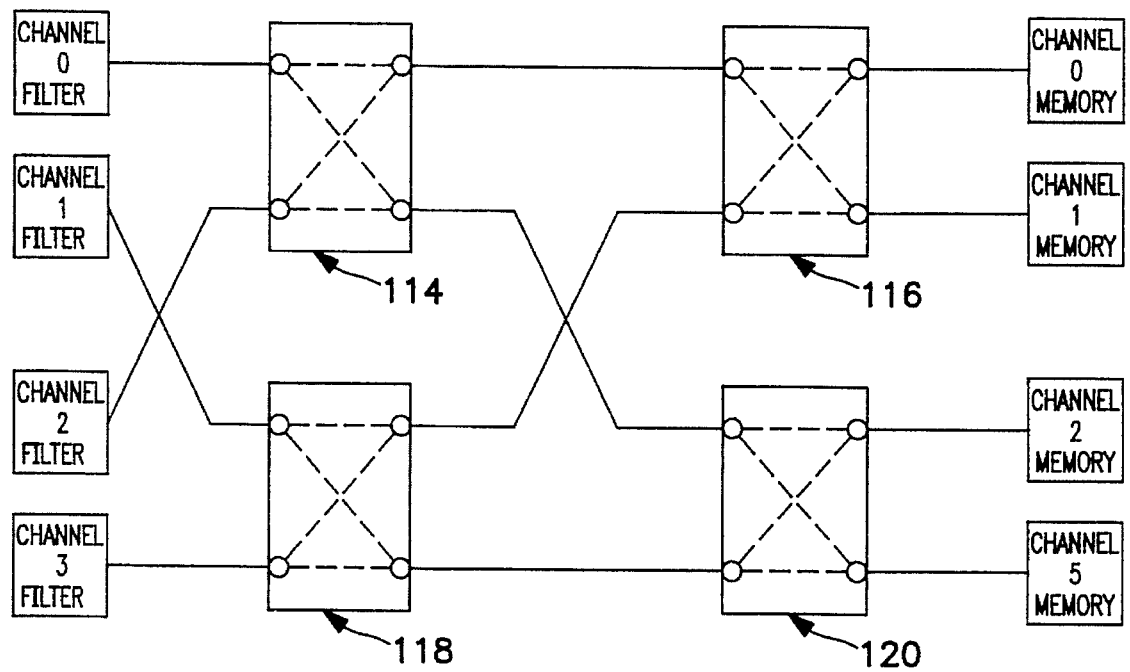
FIG. 18A
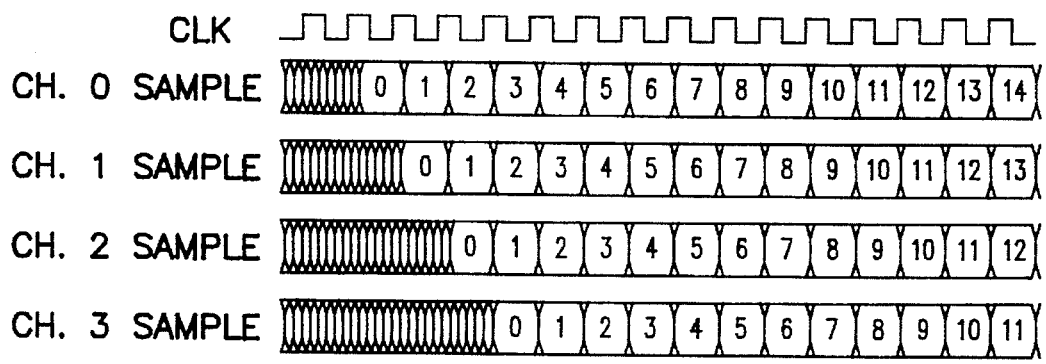
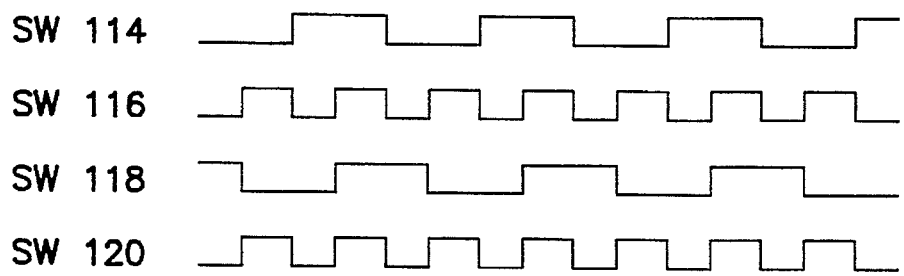
FIG. 18B

FLEXIBLE PARALLEL PROCESSING ARCHITECTURE FOR VIDEO RESIZING

FIELD OF THE INVENTION

The present invention relates to video resizing, and in particular, to a digital resampling system for converting from one video/television format to another video/television format using the same filtering bank for both horizontal and vertical resampling operations.

BACKGROUND OF THE INVENTION

There are numerous television and video digital signal sampling rate standards. For example, a sample rate of 13.5 MHz is compatible with the 4:2:2 Component Digital Standard (CCIR 601). Sampling at this rate produces 720 active video samples per horizontal linearized line and 483 vertical lines on a standard television tube. This level of resolution is also referred to as standard definition television (SDTV). SDTV displays active video information 483 of 525 lines per image frame in interlaced mode. High Definition Television (HDTV) typically samples in the range of sample in the range 72 MHz to 81 MHz. The Society of Motion Picture and Television Engineers, SMPTE, has approved an HDTV format of 1920 samples (pixels) per horizontal line and 1035 vertical lines. In addition to this format other television formats exist, such as the D2-MAC, PAL and SECAM standards in Europe and the Wide Screen Television (WST) standard.

The horizontal and vertical pixel resolution may best be thought of as a normalized horizontal and vertical dimension for the resulting image. In this context, the images are normalized in terms of a standard sized pixel. Thus, different image resolution is translated directly to a different image size.

With the many standards in existence, it is desirable to be able to convert from one standard to another, such as for the display of a television/video signal recorded in one standard format on a television set designed for display of a different standard format. It is also desirable to keep any image distortion caused by the conversion to a minimum. Because the initial standard and final standard may not be known prior to conversion, it is also desirable to have a more universal system which can handle conversions among all of the formats.

In some instances, this spatial conversion is referred to as video resizing. For example, video resizing allows a full sized motion picture film (35 mm, 24 frame per second) having an aspect ratio greater than 16 by 9 to be displayed on an NTSC television set with an aspect ratio of 4 by 3 without having to "letter box" the output display. In the digital domain, video resizing requires that the input signal be digitally resampled.

Digital resampling produces a different representation of the digital input signal by calculating points of the displayed signal that did not necessarily exist in the original signal. New samples are generated at instants which did not previously have samples through an interpolation technique. A flexible digital interpolation filtering architecture is capable of resizing a video/television line to an arbitrary size. An example of video resizing is described in U.S. Pat. No. 08/317,474 issued Nov. 4, 1994, entitled FILTER SELECTION CIRCUIT FOR DIGITAL RESAMPLING SYSTEM, which is incorporated by reference herein.

Another example of video resizing takes place in picture-in-picture television displays. U.S. Pat. No. 4,652,908 issued Mar. 24, 1987 entitled FILTERING SYSTEM FOR PROCESSING A REDUCED RESOLUTION VIDEO IMAGE, describes a system for video signal processing to produce a reduced size image for display inside of a larger image television screen. This system involves a reduction of the signal to an already known, smaller picture size.

In order to carry out the resizing, it is necessary for both horizontal and vertical resampling to take place. For example, to convert a 1920×1035 HDTV signal to a 720× 483 SDTV signal it is necessary to have both a horizontal and a vertical resampling operation. For a real time or near real time applications, it is desirable for the horizontal and vertical resizing operations to take place at substantially the same time. A block based approach for carrying out this process has been used, whereby each picture (i.e. image frame) is broken up into block-shaped pieces and each piece is resampled by a separate processor. Each of these multiple processors works in parallel on a single block. This process can be awkward in that it introduces problems relating to interpolation and overlap requirements. Once processing is complete for each of the separate subdivided blocks, the final image is created by piecing together the separately processed blocks.

Another method for carrying out both horizontal and vertical resampling is to use a Finite Impulse Response (FIR) filter, which includes a tapped delay line, for the vertical processing where the total delay provided by the delay line is on the order of several line intervals. This method, however, requires very high overhead because of memory requirements. If sufficient processing does not take place, (for instance because of insufficient memory) the range and quality of the conversion will be degraded.

SUMMARY OF THE INVENTION

The present invention comprises a system for converting a digital input signal having a vertical and horizontal picture element (pixel) resolution into a digital output signal having a different horizontal and vertical pixel resolution. The digital input signal is fed into a first memory which stores the input signal. A horizontal resampling filter is used to convert the normalized horizontal dimension of the digital input signal to the normalized horizontal dimension of the desired output signal. The output signal of the horizontal resampling means is transposed so that the vertical dimension of the output signal is in a horizontal orientation. The transposed signal is then stored in a second memory.

The transposed signal having the resampled horizontal dimension in the second memory is fed into a vertical resampling filter which converts the vertical dimension information of the transposed signal to the desired format of the output signal. This vertically resampled signal is then transposed so that the horizontal and vertical dimensions are in the same orientation as the digital input signal. The newly transposed signal is then stored in a third memory as the digital output signal.

BRIEF DESCRIPTION OF THE FIGURES

The invention will be described by way of non-limiting example, with reference to the attached drawings in which:

FIG. 1 is block diagram of a three filter video resizing system in accordance with an exemplary embodiment of the present invention;

FIG. 2 is a block diagram of the video resizing system shown in FIG. 1 with the inclusion of FIFO memory buffers;

FIGS. 4A, 4B and 4C are timing diagrams which are useful for describing the operation of the exemplary embodiment of a video resizing system in accordance with the present invention shown in FIG. 2;

FIG. 12 is a block diagram of a processing cell shown in FIG. 1;

FIG. 13 is a block diagram of an exemplary embodiment of a processing cell as shown in FIG. 1 with connection to a switching matrix;

FIG. 18A is a block diagram of a four channel switching matrix connection;

FIG. 18B is a timing diagram which is useful for describing the matrix shown in FIG. 18A (showing samples for one of the four channels);

DETAILED DESCRIPTION OF THE INVENTION

Figure 3:
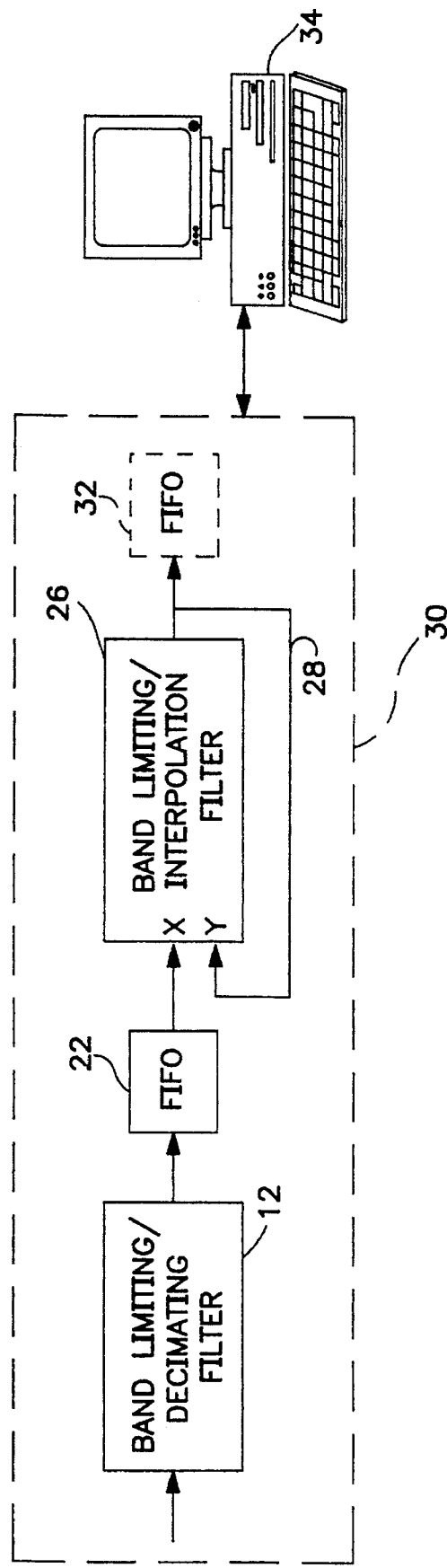
FIG. 3 is block diagram of an alternate embodiment of the video resizing system shown in FIG. 2 wherein the decimating filter also comprises bandlimiting capability and the bandlimiting filter and interpolating filter are contained in a single block with a feedback loop.

FIG. 1 shows an exemplary video resizing system 10 in accordance with the present invention. System 10 is a digital filter system which takes digital signal information corresponding to a television/video signal as one input signal in one sample format and outputs digital signal information in a sample format different than the input signal format. System 10 is a one dimensional filtering system which, as described below, can process the input signals horizontally and vertically. For the embodiments described herein, signal information is read into the filtering system in an horizontal orientation (i.e. by rows) for resampling.

System 10 is not designed for a specific video resizing format conversion, but rather is designed as a flexible interpolation filtering architecture capable of resizing any video line format to an arbitrary size. The resizing is carried out in the digital domain without conversion of digital signals into analog signals for processing.

Video resizing in accordance with the present invention is divided into three areas or conversion regions. The first is upsampling, where the input digital samples are converted into a digital sample format having a higher sampling rate. An example is going from a standard definition television signal (i.e. 720 samples per line) to high definition television signal (i.e. 1920 samples per line). The second is downsampling, where the ratio of the samples per line of the input signal information to the desired samples per line of the output signal information is greater than 0.5 and less than 1.0. An example of downsampling is converting from wide screen television (16 by 9 aspect ratio having 960 samples per line) to standard definition television (4 by 3 aspect ratio i.e. 720 samples per line). Finally, the third area is decimating, where the ratio of input sample to output sample format is less than or equal to 0.5. An example of decimating is converting from high definition television (i.e. 1920 samples per line) to standard definition television (i.e. 720 samples per line).

System 10 includes 3 filters. The three filters are decimating filter 12, bandlimiting filter 14 and interpolating filter 18. Decimating filter 12 and bandlimiting filter 14 may be combined in a single integrated circuit chip, illustrated as block 16. Additional bandlimiting can occur prior to decimating.

In upsampling mode, decimating filter 12 and bandlimiting filter 14 do not filter input data, instead they operate as "all pass" filters. This is because interpolating filter 18 is sufficient for upsampling input data to a higher sample format without the need for bandlimiting. Interpolating filter 18 can then be programmed to generate the additional samples required by the higher output sample rate format.

In downsampling mode, decimating filter 12 does not filter the input sample data (i.e. it acts as an all pass filter), because the bandwidth of the higher input sample data is not too high for the lower sampling format. If a digital signal is simply downsampled without bandlimiting, the result will be aliased. Therefore, its is necessary to band limit the input signal prior to downsampling. Accordingly, bandlimiting filter 14 serves to reduce the bandwidth of the input signal prior to downsampling by interpolating filter 18.

Bandlimiting filter 14 can be a Finite Impulse Response (FIR) filter that can select from among a bank of filter coefficients which are determined by a scaling factor. The scaling factor is the ratio of the input sample rate to the output sample rate. Bandlimiting filter 14 reduces the bandwidth of the input signal enough to prevent aliasing from taking place in interpolating filter 18.

The third mode requires decimating in the downsampling process. If the scaling factor is less than 0.5, the quality of the conversion from the higher input sample rate format to the lower output sample rate format using only the bandlimiting filter 14 can be adversely affected, because bandlimiting filter 14 may not be able to sufficiently reduce the bandwidth prior to interpolation. When the scaling factor is less than 0.5, decimating filter 12 decimates the input data by an integer amount in an exemplary embodiment. In an exemplary embodiment, decimating filter 12 may be, for example, a Harris HSP43168 integrated circuit. This particular decimating filter decimates the input data by a factor of 2, 4 or 8. Further decimations are fully within the description of the invention, requiring a different integrated circuit and/or additional circuitry, as would be understood by those skilled in that art. For instance, two Harris HSP43168 chips could be used in series to increase the decimating factors. Referring back to the embodiment shown in FIG. 1, the input sample can be decimated by a factor of 2, 4 or 8 to achieve a sample rate of ½, ¼ or ⅛, of its original sample rate, prior to entering bandlimiting filter 14, to further reduce the bandwidth. The Harris filter is also capable of simple FIR filtering operations to provide bandlimiting for upsampling and downsampling modes, acting as a combined decimating filter and bandlimiting filter.

If an input signal having a sample rate of 1920 samples per line were to be resized to an SDTV sample format of 720 samples per line, decimating mode (mode 3) for system 10 would be used. The input signal of 1920 samples per line enters decimating filter 12 where a decimation of ½ (decimating factor of 2) takes place. This results in every other sample being thrown out, i.e. only one-half of input signal samples are used. Two is the largest integer which can be divided into 1920 and yield a result which is greater than or equal to the desired output sample rate of 720. The decimated signal of 960 samples then enters bandlimiting filter 14 where the bandwidth of the signal is reduced. The 960 sample reduced bandwidth signal then enters interpolating filter 18 where a downsizing interpolation takes place, converting the 960 samples to 720 samples. The 720 samples are then output from interpolating filter 18.

FIG. 2 shows a one-dimensional video resizing system 20. Video resizing system 20 takes the three filter components of system 10 and adds a FIFO memory buffer 22 between decimating filter 12 and bandlimiting filter 14 and a FIFO memory buffer 24 between bandlimiting filter 14 and interpolating filter 18. FIFO memories 22 and 24 are line buffer memories (first in first out memory circuits). FIFOs 22 and 24 hold data prior to entry into the next circuit phase. For example, in decimating mode using a scaling factor of 2, decimating filter 12 writes every other sample into FIFO 22. Bandlimiting filter 14 then reads every sample out of FIFO 22 (960 samples total) when performing its bandlimiting operations. Without FIFO 22, bandlimiting filter 14 would operate on every other input sample (assuming a decimating factor of 2) requiring bandlimiting filter 14 to constantly stop and start its operation. FIFO 22 allows a constant operation of bandlimiting filter 14.

An example operation of system 20, illustrated as three lines for each of the three modes described above, is shown in FIGS. 4A, 4B and 4C.

FIG. 4A shows system 20 operating in upsampling mode to increase the number of samples in a horizontal line of an image. The operation of decimating filter 12, bandlimiting filter 16 and interpolating filter 18 are shown in time sequence against a horizontal sync pulse signal H. As the first line of input data enters decimating filter 12 of system 20, decimating filter 12 acts as an all pass filter while bandlimiting filter 14 and interpolating filter 18 are inactive, because no data has as yet reached these filters. During the second line interval, decimating filter 12 and bandlimiting filter 14 both act as all pass filters while interpolating filter 18 is still inactive. During the third line interval, decimating filter 12 and bandlimiting filter 14 still act as all pass filters while interpolating filter 18 interpolates input data corresponding to the first line of video information. During the fourth line interval, decimating filter 12 and bandlimiting filter 14 act as all pass filters and interpolating filter 18 interpolates the second line of video information. This continues for each line of video information input into system 20.

In FIG. 4B, the downsampling mode of operation of system 20 is illustrated in time line format. In this example, the number of samples in a horizontal line is decreased. During the first line interval of the horizontal sync signal H, decimating filter 12 acts as an all pass filter while bandlimiting filter 14 and interpolating filter 18 are inactive. During the second line interval, decimating filter 12 acts as an all pass filter while bandlimiting filter 14 band limits the first line of information. Interpolating filter 18 is still inactive during this second line interval. During the third line interval, decimating filter 12 still acts as an all pass filter while bandlimiting filter 14 limits the bandwidth of the second line of data. Data for line one has now reached interpolating filter 18 where an interpolation for downsampling takes place. During the fourth line interval, decimating filter 12 acts as an all pass filter while bandlimiting filter 14 limits the band width of the third line of input data. Interpolating filter 18 interpolates the second line of input data.

FIG. 4C illustrates the operation of the decimating mode of system 20 in a time line format. This mode is used when the downsampling is by a factor of more than two to one. During the first cycle, decimating filter 12 decimates the line one information. In going from 1920 samples to an ultimate output of 720 samples, a scaling factor of 2 is used to reduce the number of input sample by one-half. During the first horizontal line interval, bandlimiting filter 14 and interpolating filter 18 are inactive. In the second line interval, decimating filter 12 decimates the second line of information. Bandlimiting filter 14 bandlimits the first line of information during the first half of horizontal line interval and is inactive during the second half. Bandlimiting filter 14 only operates during one half of the horizontal line interval because only one half of the original input signal is present, following decimation. Interpolating filter 18, too, only operates during one half of the horizontal line interval. In the third horizontal line interval decimating filter 12 decimates the third line of input data while bandlimiting filter 14 limits the bandwidth of the second line during half of the horizontal line interval. Interpolating filter 18 interpolates the second line of input data during one-half of the horizontal line interval. A similar set of operations takes place during the fourth and subsequent horizontal line intervals.

It is also possible to run the filter at different clock rates. For example, decimating filter 12 can operate at a first-clock-rate while bandlimiting filter 14 operates at one-half of the clock rate of decimating filter 12. In this way, data is written to the FIFO 22 at a faster rate and read from the FIFO 22 at a slower rate. If decimating filter 12 is holding the data, then the data flow appears constant (i.e. no period of inactivity).

FIG. 3 shows a video resizing system 30. Video resizing system 30 is an additional embodiment of the present invention wherein decimating filter 12 also includes bandlimiting capability and bandlimiting filter 14 and interpolating filter 18 are combined in a single semi-conductor chip 26. A feedback path 28 returns data following bandlimiting operation to an input Y to carry out the interpolation operation. An additional FIFO 32 can operate following interpolation in interpolation circuit 26. FIFO 32 would be loaded with data corresponding to the interpolation taking place.

A computer 34 is shown connected to system 30 for control of the filters contained in system 30. Computer 34 includes a microprocessor, a keyboard, a display, a storage device and input/output (I/O) hardware for connection to system 30.

Figure 5A:
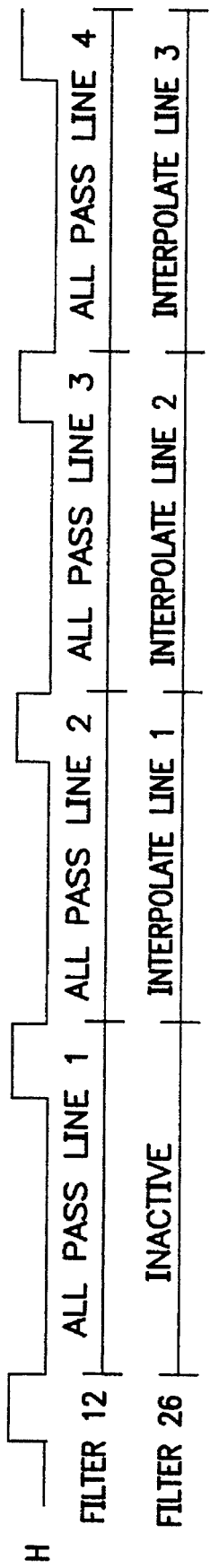
FIGS. 5A, 5B and 5C are timing diagrams which are useful for describing the operation of the exemplary embodiment of the present invention shown in FIG. 3.
Figure 5B:
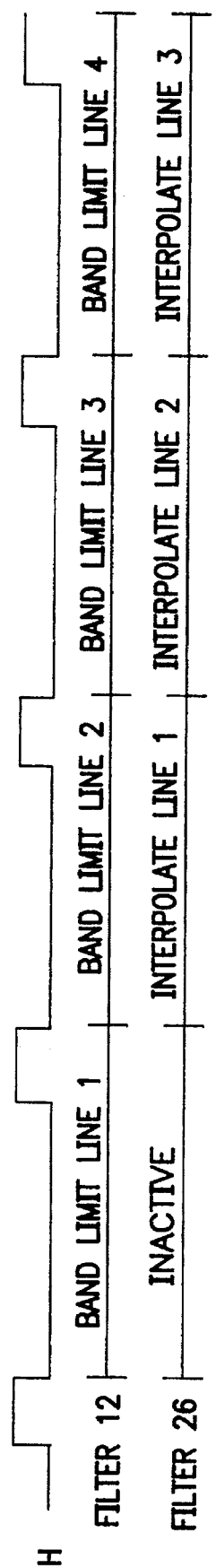
Figure 5C:
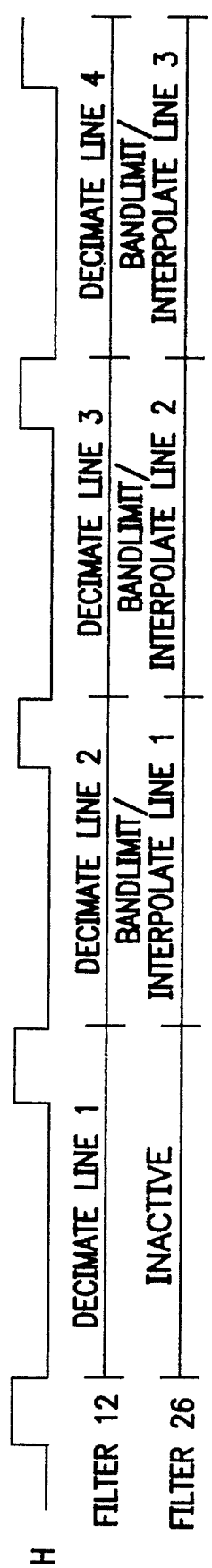

FIGS. 5A, 5B and 5C illustrate the upsampling mode, downsampling mode and decimating mode operation of system 30. In FIG. 5A, decimating filter 12 acts as an all pass filter for all horizontal lines of the image. Bandlimiting/interpolating filter 26 is inactive during the first horizontal line interval. During the second and subsequent line intervals, filter 26 interpolates the previous line which passed through filter 12.

FIG. 5B illustrates the downsampling mode operation of system 30. In downsampling mode, filter 12 acts as a bandlimiting filter during each horizontal line interval. During the first horizontal line interval, filter 26 is inactive. During the second and subsequent line intervals, filter 26 interpolates the previous input line which has undergone bandlimiting during the previous line interval.

In FIG. 5C, the decimating mode operation of system 30 is illustrated. During each horizontal line interval, filter 12 decimates the current input line. During the first line interval, filter 26 is inactive. During the second and subsequent line intervals, filter 26 carries out both a bandlimiting operation of the signal which was decimated in the previous line interval. During the second half of the line interval, filter 26 carries out its interpolation operation.

Interpolating filter 18 and bandlimiting/interpolation filter 26 may be a Gennum GF90101 filter in an exemplary embodiment of the present invention. This filter is a multi phase FIR filtering integrated circuit capable of both interpolation and simple FIR filtering. The circuit has a dual input port multiplexing capability which allows for two concurrent filtering operations (i.e. decimating mode). In decimating mode, decimating filter 12 of system 30 decimates the input data, leaving less than half of the input data to be passed to bandlimiting/interpolation filter 26. Filter 26 thus has enough time to carry out its bandlimiting operation and its interpolation operation, concurrently.

Both decimating filter 12 and bandlimiting/interpolation filter 26 of system 30 contain separate memory banks of selectable filter coefficients in an exemplary embodiment of the present invention. Decimating filter 12 has a memory consisting of 32 locations of 8 taps each. Memory locations 0–19 contain the tap weighting coefficients for the decimating filters while locations 20–31 contain the tap weighting coefficients for the bandlimiting filters. Using the Harris integrated circuit in an exemplary embodiment, filter 12 is able to utilize a fold-over filter architecture. Although consisting of only 8 taps, it is capable of implementing a 15 tap filter. Thus, the tap values that are stored in memory represent only half of the complete filter (this limits this use of the Harris integrated circuit to applications in which symmetric filters may be used).

The filter length that is used for decimating mode is longer than for simple FIR filters. For example, when decimating by a factor of 2, a 31 tap filter is used. This requires 2 separate memory locations for each tap. When decimating by a factor of 4, a 63 tap filter is used, requiring 4 separate memory locations for each tap. If decimating by a factor of eight, a 127 tap filter is used and the integrated circuit is configured to have eight memory locations per tap.

TABLE 1

Memory Contents of Decimating Filter 12 for System 30

| Location(s) | Filter |
|---|---|
| 0,1 | Horizontal 2:1 decimation |
| 2,3 | Vertical 2:1 decimation |
| 4,5,6,7 | Horizontal 4:1 decimation |
| 8,9,10,11 | Vertical 4:1 decimation |
| 12 to 19 | Horizontal and Vertical 8:1 decimation |
| 20 | Horizontal Bandlimiting Filter #2 |
| 21 | Horizontal Bandlimiting Filter #3 |
| 22 | Horizontal Bandlimiting Filter #4 |
| 23 | Horizontal Bandlimiting Filter #5 |
| 24 | Horizontal Bandlimiting Filter #6 |
| 25 | Vertical Bandlimiting Filter #2 |
| 26 | Vertical Bandlimiting Filter #3 |
| 27 | Vertical Bandlimiting Filter #4 |
| 28 | Vertical Bandlimiting Filter #5 |
| 29 | Vertical Bandlimiting Filter #6 |
| 30 | Horizontal Bandlimiting Filter #1 |
| 31 | Vertical Bandlimiting Filter #1 |

The memory for bandlimiting/interpolation filter 26 in an exemplary embodiment using the Gennum GF9101 chip has a capacity of 108 locations of 12 tap weighting coefficients per location. Memory locations 0–95 contain interpolation filters which cannot be modified with software. The bandlimiting filters that are used in the decimating mode are held in locations 96–107. The following table is a listing of the memory contents of bandlimiting/interpolation filter 26.

TABLE 2

Memory Contents of Bandlimiting/Interpolation 26 Filter of System 30

| Location(s) | Filter |
|---|---|
| 0 to 95 | Interpolation Filters |
| 96 | Horizontal Bandlimiting Filter #1 |
| 97 | Horizontal Bandlimiting Filter #2 |
| 98 | Horizontal Bandlimiting Filter #3 |
| 99 | Horizontal Bandlimiting Filter #4 |
| 100 | Horizontal Bandlimiting Filter #5 |
| 101 | Horizontal Bandlimiting Filter #6 |
| 102 | Vertical Bandlimiting Filter #1 |
| 103 | Vertical Bandlimiting Filter #2 |
| 104 | Vertical Bandlimiting Filter #3 |
| 105 | Vertical Bandlimiting Filter #4 |
| 106 | Vertical Bandlimiting Filter #5 |
| 107 | Vertical Bandlimiting Filter #6 |

In an exemplary embodiment, the operational modes of system 30 have been divided over six different filter characteristics. These filter characteristics are shown in the following table.

TABLE 3

Filter Selection Table for System 30

| Scaling Factor | Bandlimiting Filter |
| --- | --- |
| >=1.0 | Horizontal/Vertical Filter #1 |
| <=1.0 and >11/12 | Horizontal/Vertical Filter #2 |
| <=11/12 and >5/6 | Horizontal/Vertical Filter #3 |
| <=5/6 and >3/4 | Horizontal/Vertical Filter #4 |
| <=3/4 and >2/3 | Horizontal/Vertical Filter #5 |
| <=2/3 and >0.5 | Horizontal/Vertical Filter #6 |

For example, if the number of active input samples is 1920 (i.e. for interlaced HDTV) and the number of active output samples desired is 1280 (i.e. for progressive HDTV) the scaling factor is calculated as 1280÷1920=2/3. From the above table it is seen that this conversion requires Horizontal/Vertical Filter #6 as the bandlimiting filter portion of decimating filter 12 of system 30.

When operating in decimating mode, filter 12 decimates by a factor of 2 when the scaling factor is >0.25 and <=0.5. When the scaling factor is >0.125 and <=0.25, decimating filter 12 decimates by a factor of 4. Finally, when the scaling factor is less than or equal to 0.125, decimating filter 12 decimates by a factor of 8.

When operating in decimating mode, bandlimiting/interpolation filter 26 operates in its bandlimiting mode. The particular bandlimiting filter to be used is selected taking into account any decimating which takes place prior to bandlimiting. For example, coming from high definition television to standard definition television, the scaling factor is 720÷1920=0.375. Since the scaling factor is <0.5 system 30 operates in decimating mode. Once decimating filter 12 decimates the input samples by a factor of 2, 960 samples are provided, first to FIFO 22 and then to bandlimiting interpolation filter 26. Filter 26 bandlimits the signal resolution from 960 samples to 720 samples. The scaling factor for filter B then becomes 720÷960=0.75. Using the above table, a scaling factor of 0.75 results in the use of bandlimiting filter #5 of filter 26. Thus, the scaling factor for decimating filter 12 is different than that of bandlimiting/interpolation filter 26.

Figure 6A:
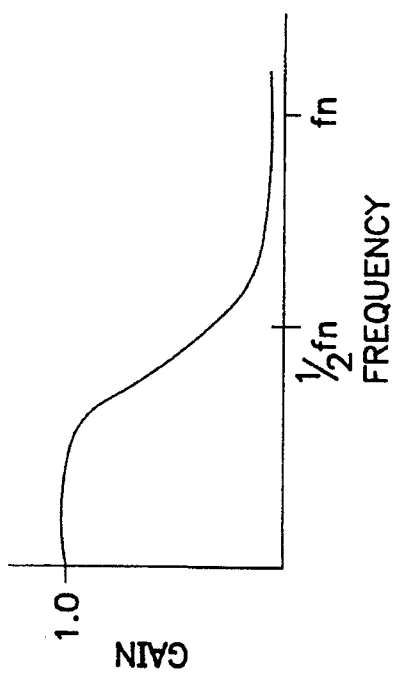
FIGS. 6A, 6B and 6C are frequency response curves for three different decimating filters, which decimates by factors of 2, 4 and 8 respectively.
Figure 6B:
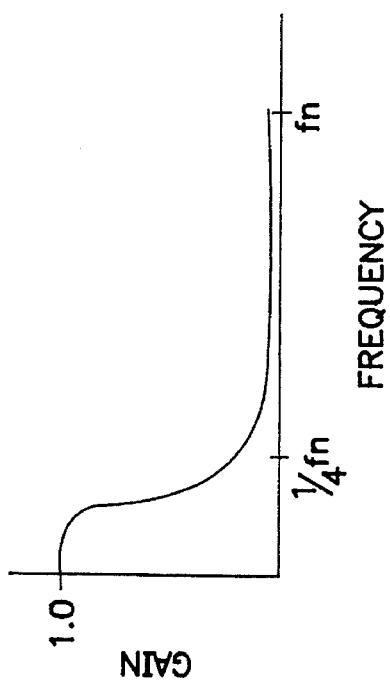
Figure 6C:
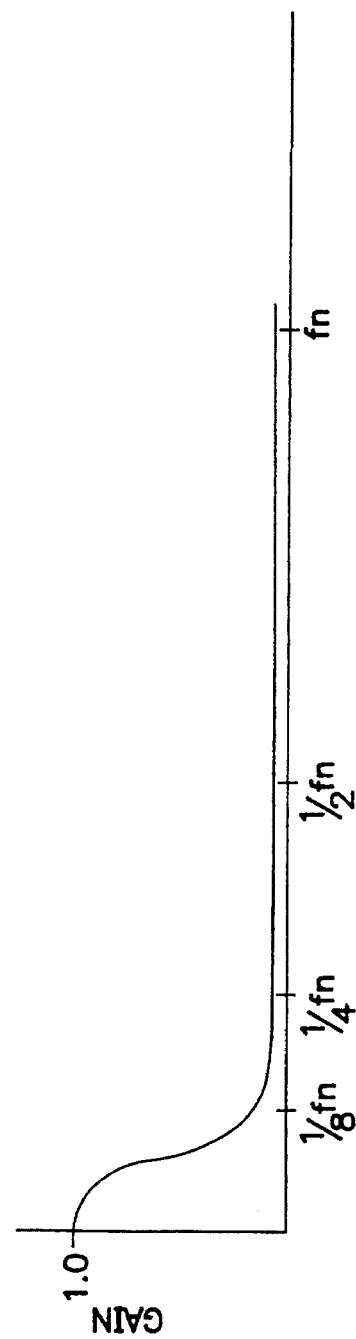

FIGS. 6A, 6B and 6C show example filter response graphs for decimating filter 12 shown in system 30. In each of these figures, $f_n$ equals a Nyquist frequency. FIG. 6A shows the filter response during a 2:1 decimation. FIG. 6B shows a filter response during a 4:1 decimation. FIG. 6C shows a filter response during an 8:1 decimation.

FIGS. 7A–7F are example filter response graphs illustrating bandlimiting filter 26 used in system 30. FIGS. 7A–7F correspond to filters 1 through 6 listed in the table 3 described above.

Figure 7A:
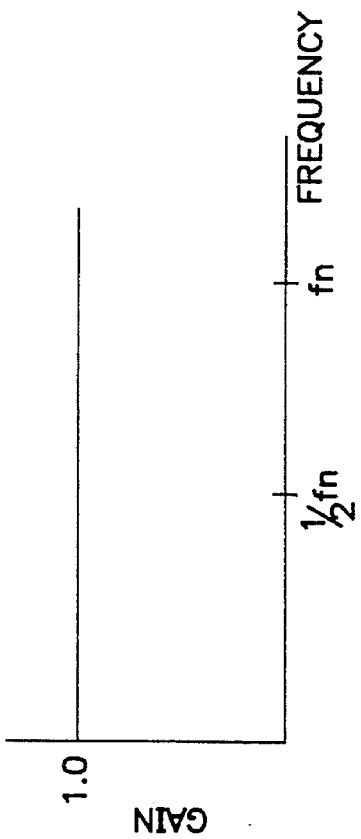
FIGS. 7A, 7B, 7C, 7D, 7E and 7F are frequency response curves corresponding to various scaling factors in the operation of the exemplary embodiment of the present invention shown in FIG. 3.
Figure 7B:
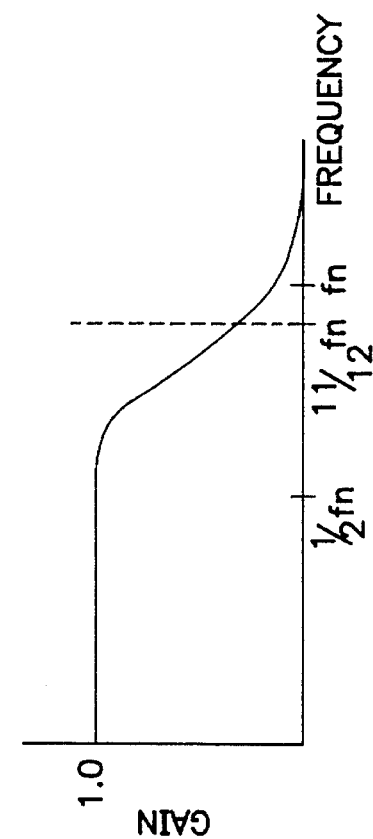
Figure 7C:
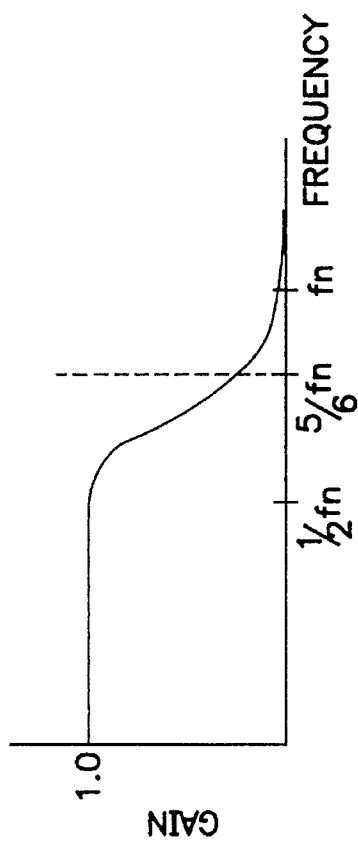
Figure 7D:
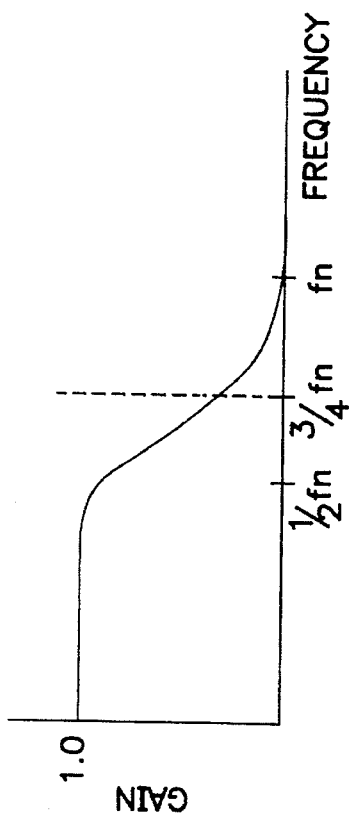
Figure 7E:
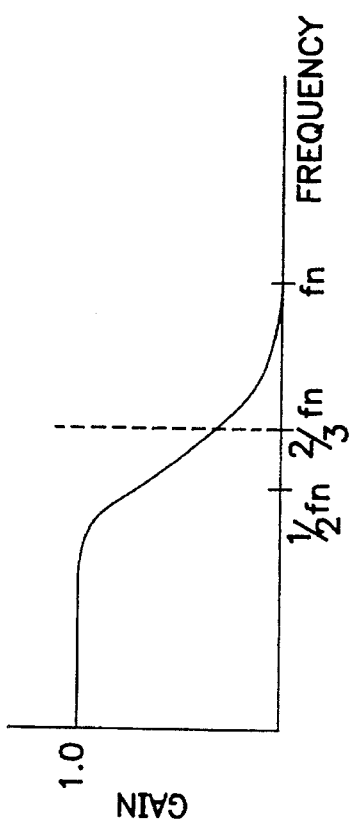
Figure 7F:
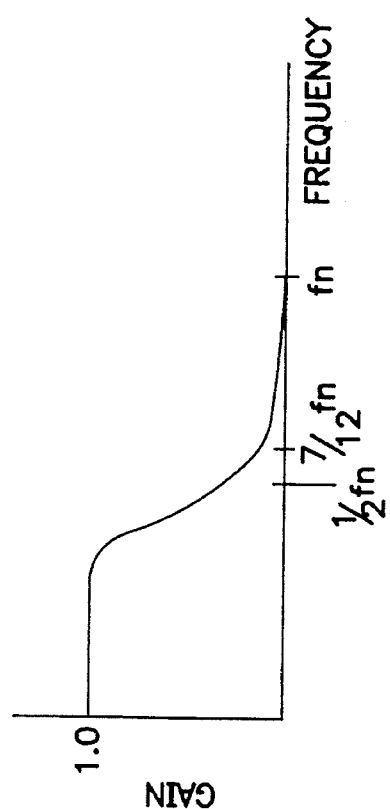

For example, referring to FIG. 7A, a scaling factor of greater than or equal to 1 results in the all-pass frequency response characteristics shown in FIG. 7A when using horizontal/vertical filter no. 1. Similarly, referring to FIG. 7B, there is shown a filter response characteristic when the scaling factor is less than or equal to 1.0 and greater than 11/12 using a horizontal/vertical filter no. 2. The remaining FIGS. 7C–7F correspond to frequency characteristics on horizontal/vertical filters no. 3–6 are used, respectively.

When dealing with an SDTV interlaced output signal, the active vertical size is equal to the number of active lines in the full frame. When converting to an SDTV interlace format a video resizing system, such as system 30 generates a progressive (non-interlaced) output signal. Additional output processors (not shown) then drop every other line to produce an interlaced format output signal.

In operation, the filters listed in tables 1 and 2 are contained in a computer file stored in computer 34 (FIG. 3). This file may be contained, for example, in a storage device such as a hard disk drive of personal computer 34. Storage means other than a hard disk drive and processor means other than a personal computer can be used for these purposes as will be understood by those skilled in the art. The format controller which operates a video resizing system, such as system 30, uses this file in constructing the necessary filter coefficients to carry out a desired format conversion. In an exemplary embodiment, a separate computer program stored in computer 34 is used to build a second computer file from the filter information contained in the first computer file. The second computer file is in a form suitable for use by system 30.

In an alternate embodiment, a user can provide specific filter coefficients for the decimating filter 12 or the bandlimiting filter 26. Providing filter coefficients allows the generation of filter characteristics having frequency response curves different than those shown in FIGS. 6A–6C and 7A–7F.

TABLE 4

Input File Format

| Filter (one per line) | Y/C | # of taps |
| --- | --- | --- |
| Filter A Horizontal 2:1 Decimation Filter | Y | 16 |
| Filter A Vertical 2:1 Decimation Filter | Y | 16 |
| Filter A Horizontal Bandlimiting Filter | Y | 8 |
| Filter A Vertical Bandlimiting Filter | Y | 8 |
| Filter B Horizontal Bandlimiting Filter | Y | 6 |
| Filter B Vertical Bandlimiting Filter | Y | 6 |
| Filter A Horizontal 2:1 Decimation Filter | C | 16 |
| Filter A Vertical 2:1 Decimation Filter | C | 16 |
| Filter A Horizontal Bandlimiting Filter | C | 8 |
| Filter A Vertical Bandlimiting Filter | C | 8 |
| Filter B Horizontal Bandlimiting Filter | C | 6 |
| Filter B Vertical Bandlimiting Filter | C | 6 |

Table 4 shows the order in which the filters used in an exemplary embodiment appear in the input file provided by a user. The exemplary format uses a separate set of filter coefficients for luminance (Y) and chrominance (C). Thus, the C filter immediately follows the Y filters with the identical format.

The following are additional examples of the operation of an exemplary conversion using system 30. The first example is converting an image having 1125 lines in interlaced format to 525 lines in progressive format. For this conversion, the horizontal dimension components are downsampled from 1920 samples per line to 720 samples per line while the vertical dimension components are downsampled from 518 active samples per column to 484 active samples per column. The first step in the conversion is determining which filters will be used for the video resizing.

For the horizontal resizing, the scaling factor is determined to be 720÷1920=0.375. Accordingly, decimating filter 12 will be operating in decimate mode (mode 3) using a decimating factor of 2. The scaling factor for bandlimiting/interpolation filter 26 is different than the scaling factor for decimating filter 12. The scaling factor for filter 26 is 720÷960=0.75. The difference is a result of filter 26 having an input of 960 which is the original input of 1920 decimated by a factor of 2. In this mode, the necessary filters for the conversion are the horizontal 2:1 decimating filter for decimating filter 12 and the horizontal/bandlimiting filter for filter 26. When designing the bandlimiting response for filter 26, filter 26 should bandlimit to less than 0.75 of the Nyquist frequency.

For vertical dimension conversion, the scaling factor is 484÷518=0.934. Accordingly, decimating filter 12 operates in bandlimiting mode. In this mode the filter used is the all pass filter for decimating filter 12. The bandlimiting filter of filter 26 is not necessary in this mode.

The second example involves a conversion of 1125 lines of an interlaced format signal to a 525 line interlaced signal format. For this conversion, the horizontal dimension components are downsampled from 1920 samples per line to 720 samples per line while the vertical dimension components are downsampled from 518 samples per column to 484 samples per column. The actual number of rows per field that are generated as the output is 242. 484 vertical rows per frame are required because system 30 generates a progressive (non-interlaced) output signal. As previously described, to generate an interlaced output signal using the present invention, every other line is discarded.

For this second example, the filters of interest are identical to those described for the previous example (1125 interlace to 525 progressive).

For the third conversion, a 525 sample per line progressive format is converted to 1125 samples per line interlaced format. For this conversion, the horizontal dimension is upsampled from 720 samples per line to 1920 samples per line while the vertical dimension is upsampled from 484 active sample per column to 518 active samples per column. The scaling factor for the horizontal conversion is 1920÷720=2.667. Accordingly, decimating filter 12 operates in all-pass filter mode while bandlimiting/interpolating filter 26 does not carry out any bandlimiting function. For the vertical conversion, the scaling factor is 518÷484=1.07. In this mode, decimating filter 12 operates in all-pass filter mode while filter 26 does not carry out any bandlimiting operation.

Figure 8:
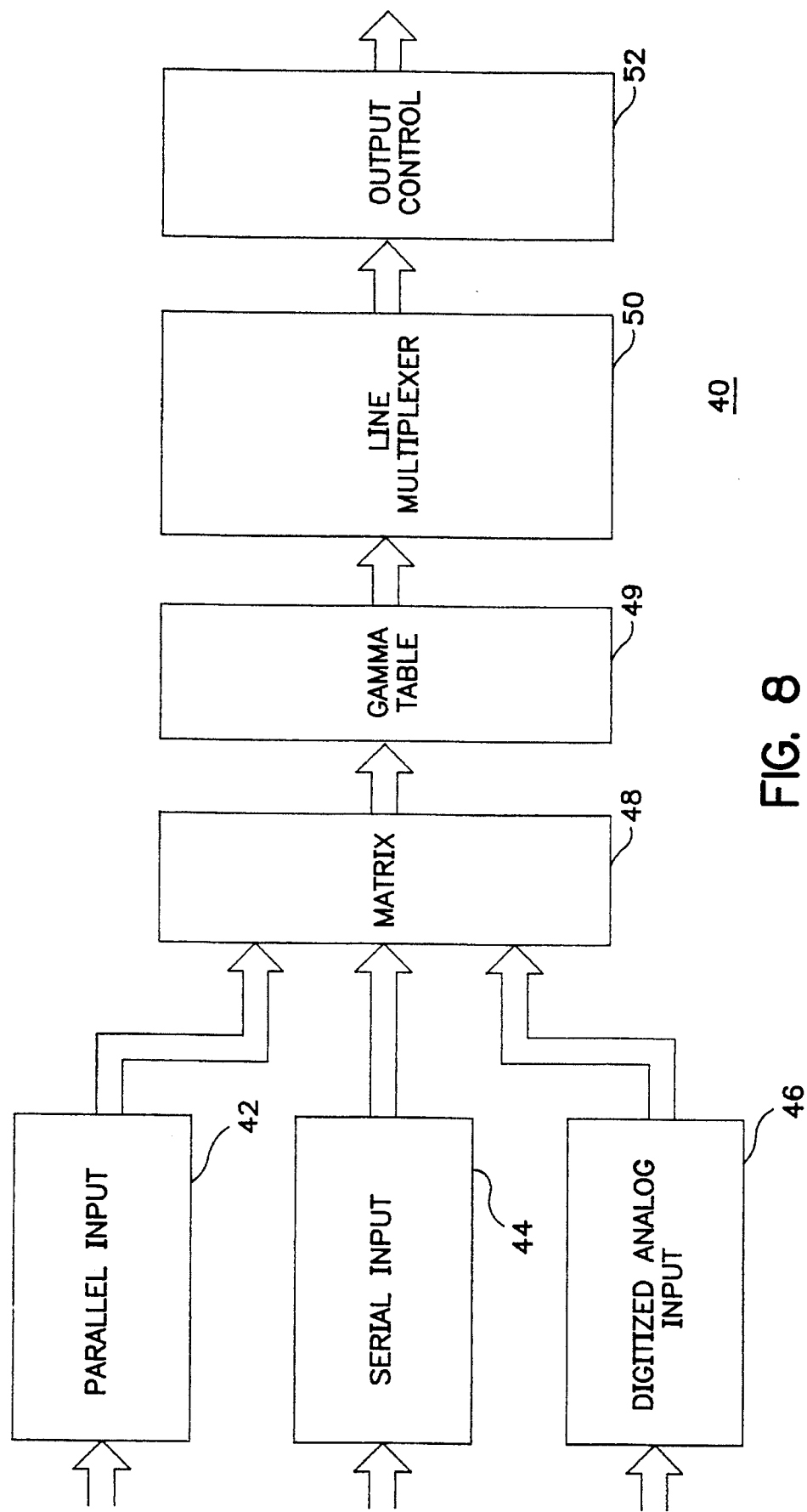
FIG. 8 is a block diagram of an input processor for a video resizing system in accordance with an exemplary embodiment of the present invention.
Figure 9:
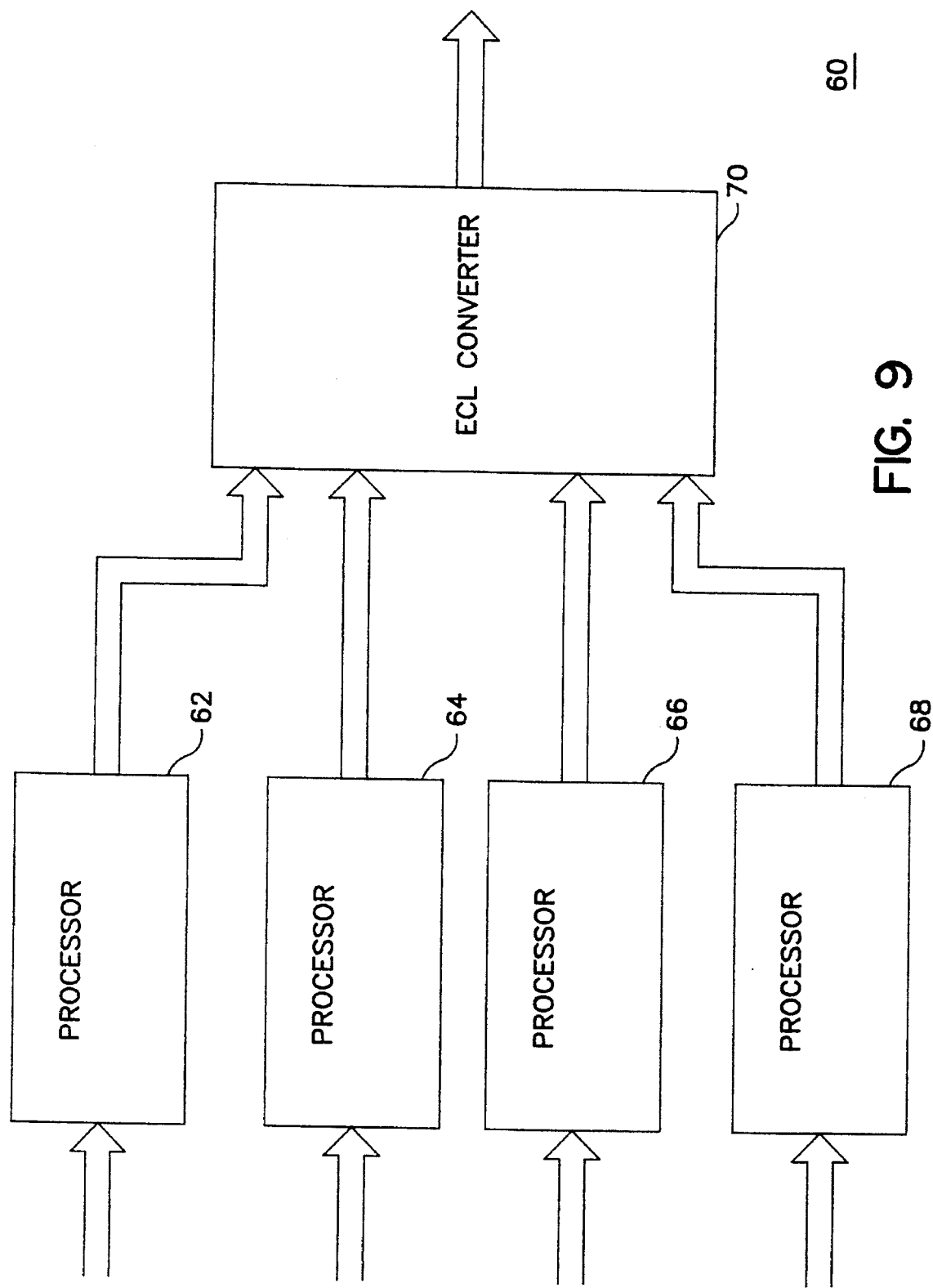
FIG. 9 is a block diagram of an output processor for a video resizing system in accordance with an exemplary embodiment of the present invention and FIG. 10 is a flow chart showing a method of operation of an exemplary embodiment of the present invention.

In an exemplary embodiment, system 30 has a digital input processing front end and a digital output processing back end shown in FIGS. 8 and 9 respectively.

Digital input processor 40 includes a parallel input block 42 for inputting signals through a parallel connection. For example, an HDTV source signal can be received in 8 bit parallel form. Digital input processor 40 also contains a serial input section for receiving a digital serial input signal such as an SDTV video signal at 270 Mbps or a wide screen standard definition TV (WSDTV) video signal at 360 Mbps or an enhanced definition TV (EDTV) video signal. In parallel input block 42, ECL signals are translated to TTL level for processing. In an exemplary embodiment, serial digital input block 44 uses a Gennum serial receiver GS9005, automatic tuning subsystem (GS9010) and decoder (GS9000) to receive serial input signals. Digitized analog input block 46 is used to receive digitized analog signals from an analog-to-digital converter. This is necessary when an analog input signal is used. After the various components of the input signal have been provided to digital input board 40, they are processed in matrix blocks 48 and gamma table block 49. Matrix block 48 is used to convert RGB sources to luminance signal (Y), and (R-Y) and (B-Y) color difference signal (i.e. YCrCb) form that is used when processing signals in an exemplary embodiment of the present invention. RGB or other signal formats can also be used as the input signal as will be understood by those skilled in the art. Gamma table 49 may be used for non-linear processing such as changing the gamma curve of an output video signal.

Gamma table 49 may also be used to change the black level of the output video by adding or subtracting a fixed offset into the luminance signal.

Signal processing continues at Line Multiplexer (MUX) block 50 where luminance and chrominance signals are reformatted for parallel processing. Line MUX 50 splits the even and odd luminance signals into four sets of line FIFOs with each FIFO having a complete luminance line. Finally, output control block 52 is used to select input signal sources using a reference signal to control writing of active data into the FIFOs of line MUX block 50. Output control 52 outputs signal for processing in system 30 through Gennum encoders (GS90002).

There shown in FIG. 9 a block diagram of digital output processor 60. Digital output processor 60 takes converted output signals from system 30 for output to a device such as an HDTV set or an SDTV set. Digital output processor 60 uses a corresponding number of processing blocks for the number of output lines output by system 30. In this example, four processing blocks 62, 64, 66 and 68 are shown. Processing blocks 62–68 convert the serial input data stream to a parallel data stream using Gennum decoders (GS9000). Various component signals are extracted from the parallel video data signal before being output to ECL section 70. ECL section 70 converts the TTL signal output from processing block 62–68 to ECL signals. ECL convertor block 70 then produces signals for display on an appropriate display device.

Figure 10:
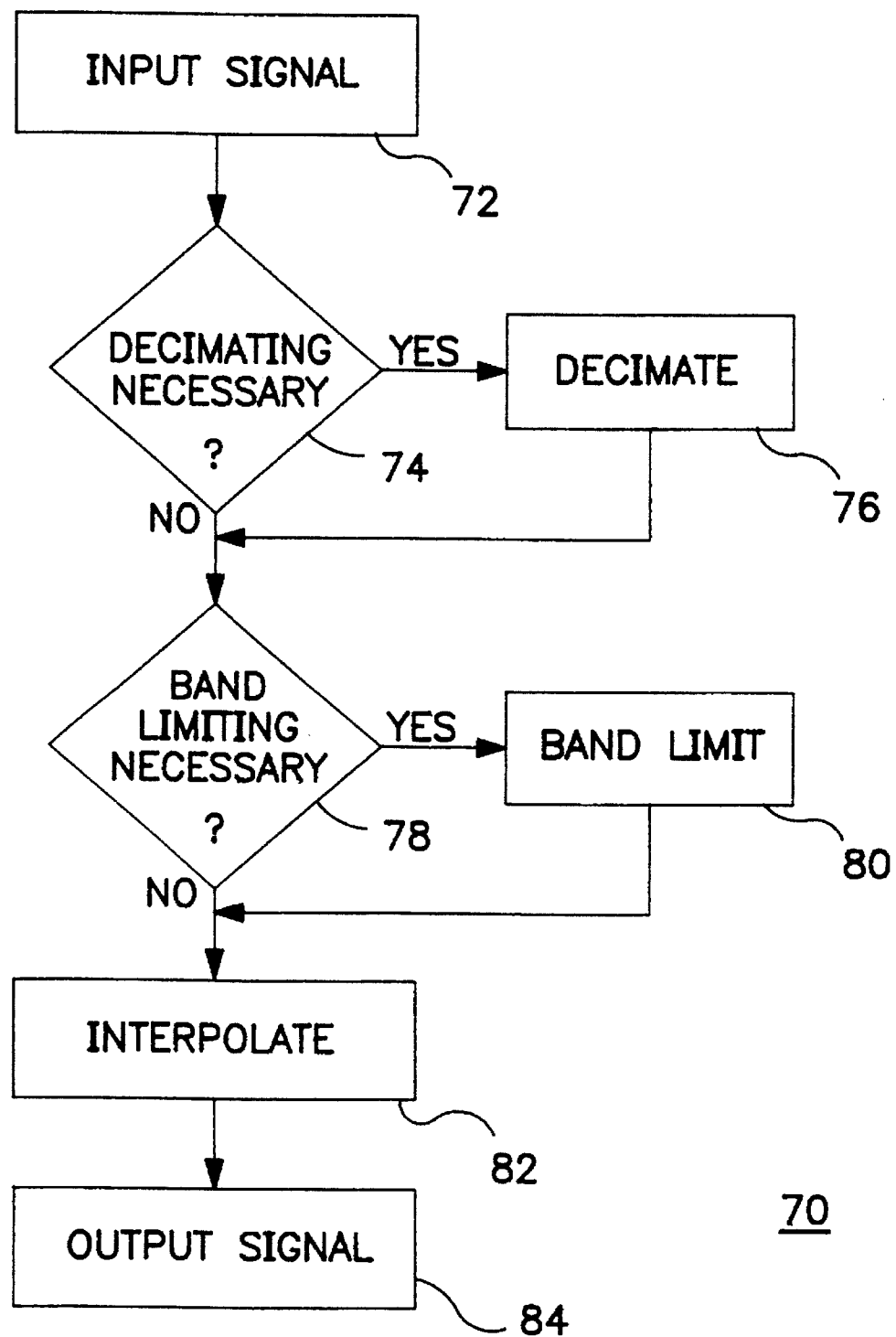

There is shown in FIG. 10 is a flowchart showing a method of operation of an exemplary embodiment of the present invention.

A signal is applied at block 72. Following input, the determination of whether decimation is necessary depends upon the difference between the sample resolution of the input signal and that of the ultimate output signal. If decimation is necessary, decimating takes place in block 76. If not, a determination is made in block 78 whether bandlimiting is necessary. The bandlimiting step depends upon the bandwidth of the signal prior to interpolation. If bandlimiting is necessary, bandlimiting takes place as indicated in block 80. The next step is interpolation at block 82. Interpolation will produce the output signal as shown in block 84. Additional steps can be added to this general method as indicated with respect to the operation of systems 10, 20 and 30, previously described.

Figure 11:
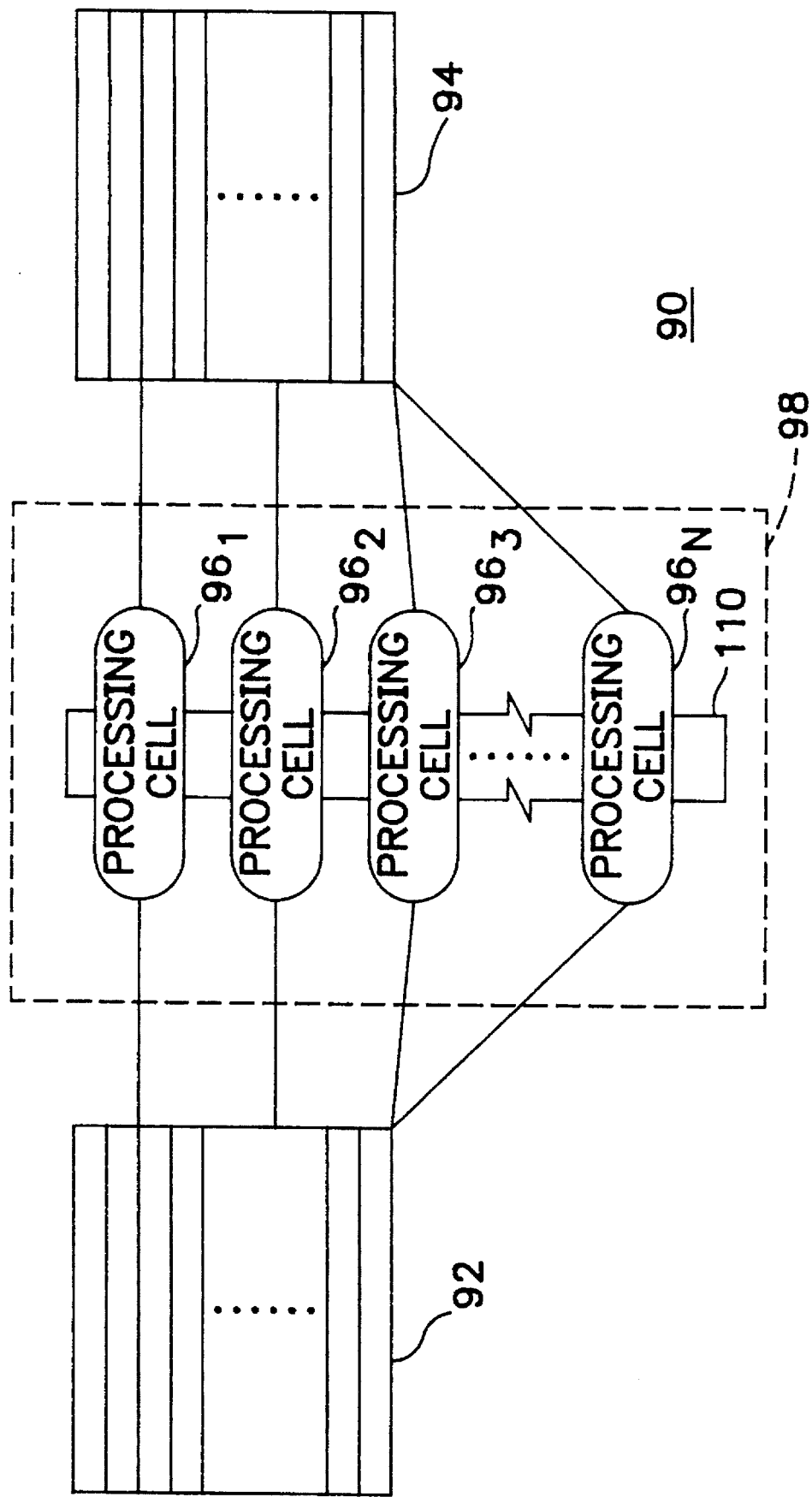
FIG. 11 is a block diagram of a parallel processing architecture in accordance with an exemplary embodiment of the present invention.

FIG. 11 shows an exemplary video resizing system 90 in accordance with the present invention. System 90 is shown with an input frame 92, having a first number of horizontal and vertical samples entering a processing cell network 98 which resizes input frame 92 to produce output frame 94 having a second number of horizontal and vertical samples, respectively. Input frame 92 is represented as a digital input signal and output frame 95 is represented as a digital output signal in the operation of the present invention. Processing cell network 98 is divided into a plurality of processing cells 96$_1$, 96$_2$ . . . 96$_n$ (referred to individually and generally as a "processing cell 96"). System 90 is not designed for a specific video resizing format conversion, but rather, is designed as a flexible (variable) interpolation filtering architecture capable of resizing any two dimensional image to a different size. The resizing is carried out in the digital domain without conversion of digital signals into analog signals for processing.

Each processing cell 96 contained in processing cell network 98 processes a predetermined number of horizontal lines (rows) of information from input frame 92, depending upon the number, n, of processing cells 96 used for a particular video resizing conversion and/or embodiment of the present invention. For example, processing cell 96₁, processes lines 1, n+1, 2n+1 and so on of input frame 92. Processing cell 96₂ processes lines 2, n+2, 2n+2 and so on. Processing cell 96ₙ processes lines n, n+n, 2n+n and so on. The final allocation of lines for processing by a particular processing cell 96 in processing cell network 98 is determined by the number of cells, n, in a particular processing cell network 98, as well as the input and output video formats.

FIGS. 12 and 13 show exemplary embodiments of a processing cell 96. In FIG. 12, a processing cell 96 is shown with a video signal input entering an input frame First In First Out (FIFO) memory 100 at a processing rate designated as 1×. The embodiment shown in FIG. 12 may be used in a system such as that shown in FIG. 11 which employs only one processing cell. FIG. 13 shows an exemplary processing cell 96; which may be used in parallel with other processing cells. In this exemplary system, then processing cell shown in FIG. 11 includes FIFO memory 100, resampling filter 21, matrix memory 102 and FIFO memory 108. Each memory holds only a portion of the image (i.e. every nth line or nth column). Switching matrix 100 is shown among all of the processing cells. It directs samples from filter 30 to memory 104 or 106 to implement the transpose function. For the sake of clarity, the operation of the processing circuitry shown in FIG. 12 will be described followed by a description of the operation of switching matrix 110 shown in FIG. 13 in distributing the samples. In an exemplary embodiment, FIFO memories are sequential memories and memories 104 and 106 are addressable memories. Additional channels 111 are shown entering switching matrix 110 to distribute sample data for transpose memory processing.

A resampling filter 21 such as resizing systems 10, 20 and 30 (previously described with respect to FIGS. 1, 2, and 3) is designed to convert the horizontal line and vertical column segments of an input signal to a desired output signal format. For example, in converting from a HDTV format of 1920×1035 to a SDTV format of 720×483, a conversion of 1920 to 720 in the horizontal dimension and 1035 to 483 in the vertical dimension is carried out by resampling filter 21. In an exemplary embodiment, resizing system 20 (described above) is used as resampling filter 21. Resampling filter 21 20 operates on an input signal in a horizontal orientation, i.e. it processes a horizontal line of the input information to output a resampled horizontal line.

The information read from FIFO 100 enters resampling filter 21 frame processing cycle or at a processing rate which is twice the processing rate at which signal information entered FIFO 60. Resampling filter 21 carries out the horizontal line format conversion during a first time period of the frame processing cycle. The horizontal line format conversion converts the horizontal dimension of the digital input signal to the predetermined horizontal dimension of the output signal. The horizontal dimension is, in effect, a number of normalized horizontal samples per unit length. Similarly, the vertical dimension of the input and output signals is the number of normalized vertical samples per unit length.

The resampled signal from resampling filter system 21 is written in transpose form to memory 104. Memory 104 is shown as one of two memories which form memory block 102. The second memory is memory 106. The resampled signal is written to memory 104 (in transpose form) during the first half of the processing cycle (i.e. the first one-half frame interval). During the second half of the processing cycle, information stored in memory 104 is read in column format, and then fed back into resampling filter 21. Feeding the resampled horizontal signal information back into resampling filter 21 allows resampling filter 20 to carry out a resampling of the vertical dimension samples, thereby completing the resampling of the original input signal which entered the particular processing cell 96. The vertical resampling corresponds to the necessary conversion to obtain the predetermined vertical output dimension for the output signal. The information from the second (vertical) resampling is then written to memory 106 in transpose form during the second half of the processing cycle.

During the first half of the processing cycle, information stored in memory 106 is also read into output frame FIFO 108. The final output signal is read from output frame FIFO 108. Because of the sequential nature of the processing described for this exemplary embodiment, as a frame of video information is being processed during a processing cycle, a new image frame is being loaded into frame FIFO 100.

In order to carry out the separate horizontal and vertical processing in real time, it may be desirable, depending on the factor by which the samples are being reduced or increased, to double the clock rate of the processing of the input signal. In this way, horizontal processing takes approximately one half of the processing cycle, while vertical processing takes approximately the second half of the processing cycle. Storing the digital input signal in input frame FIFO 100 acts as a buffer and allows the information to be read at a faster clock rate. This is represented in the Figures as a 1×signal entering frame FIFO 100 and a 2×signal leaving frame FIFO 100.

The processing described above for a single cell 96, is carried out by a plurality of processing cells 96₁–96ₙ in an exemplary embodiment, depending upon the number of parallel processing cells 96 being used. In exemplary embodiments of the present invention, 1, 2, 4, and 8 cell (or channel) systems carry out the necessary conversions. Greater or fewer number of processing cells 96 can also be used, depending upon the particular application of the present invention.

One of the problems solved by the present system relates to the speed characteristics of existing filters. Currently, filters typically operate up to approximately a 40 MHz clock speed. Filters of this nature, cannot handle the approximately 75 MHz sampling rate of some HDTV signals. Complicating this problem further, is the desirability of doubling the input signal sampling rate in order to carry out the horizontal and vertical signal resampling in real time, i.e. during a single processing cycle. In order to solve this problem in an exemplary embodiment of the present invention, multiple processing cells 96 are used and tied together with a switching matrix 110 as shown in FIG. 13. Thus, together, multiple parallel processing cells 96₁–96ₙ provide an effective processing time which is sufficient to handle the sampling rate demands of the input signal.

Using the example of an approximately 75 MHz HDTV signal as the input signal, four processing cells 96 (i.e. 96₁, 96₂, 96₃, 96₄) of the type shown in FIG. 13, each operating at approximately 40 MHz may be used to provide an effective 160 MHz sampling rate. This 160 MHz sampling rate is slightly greater than the 150 MHz sampling rate (2×75 MHz) which is required if the 75 MHz input HDTV is being doubled during processing (for handling the horizontal and vertical processing in a single processing cycle). In the exemplary embodiment, four filters operating at 40 MHz provide an effective sampling rate of 160 MHz which is sufficient to carry out the processing. More channels using slower filters could also be used so long as the cumulative sampling rate is greater than or equal to twice the sampling rate of the input signal.

Because the input signal is being doubled, and current filter operate at sampling rates of 40 MHz or below (because of filter speed limitations in the exemplary embodiment described herein) the clock rate of the input signal into frame FIFO 100 is desirably set at or slowed to 20 MHz. Thus, if four processing cells 96, each operating at 20 MHz (each with its own FIFO 100), are used, the maximum input signal clock frequency is 80 MHz (4×20 MHz). Referring again to the example of an approximately 75 MHz input signal, this maximum input signal frequency is greater than the approximately 75 MHz input signal and thus sufficient to carry out the desired processing. Being above the 75 MHz input signal rate provides the additional benefit of extra time to compensate for possible transfer delays or other delays.

Figure 15:
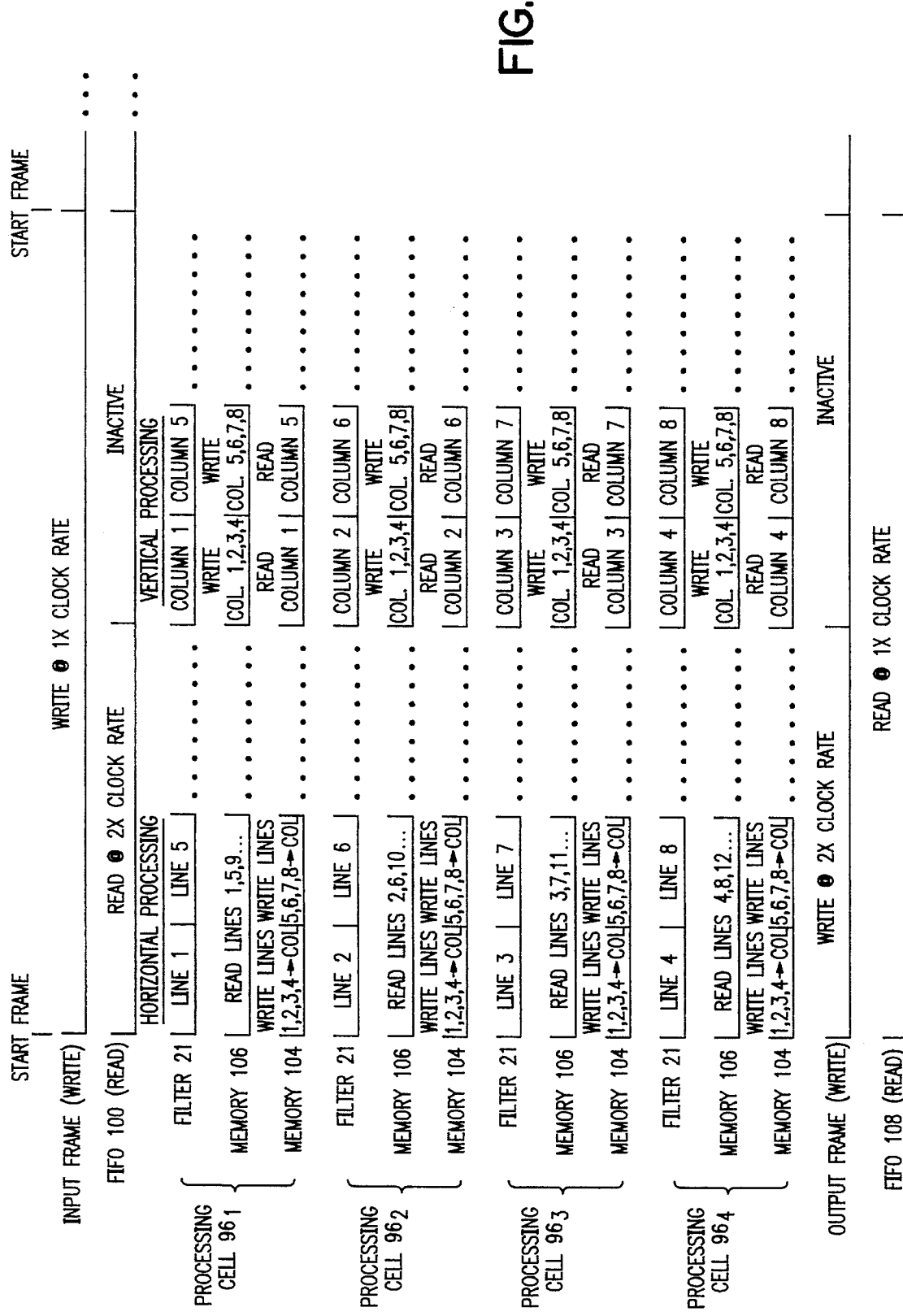
FIG. 15 is a timing diagram which is useful for understanding the operation of a four channel system in accordance with the present invention.

In order to divide the input signal into segments suitable for subprocessing by each of the processing cells $96_1$–$96_n$, a transpose memory or processing scheme is implemented to provide for both horizontal and vertical signal processing and to allow for the generation of a final output image from the separately processed signals in each of the processing cells 96. Specific horizontal lines of input frame 92 are designated for each separate processing cell 96 as shown in FIGS. 15 and 16. During processing by the separate processing cells, the transpose memories 102 of each processing cell are tied together through switching matrix 110.

Figure 14:
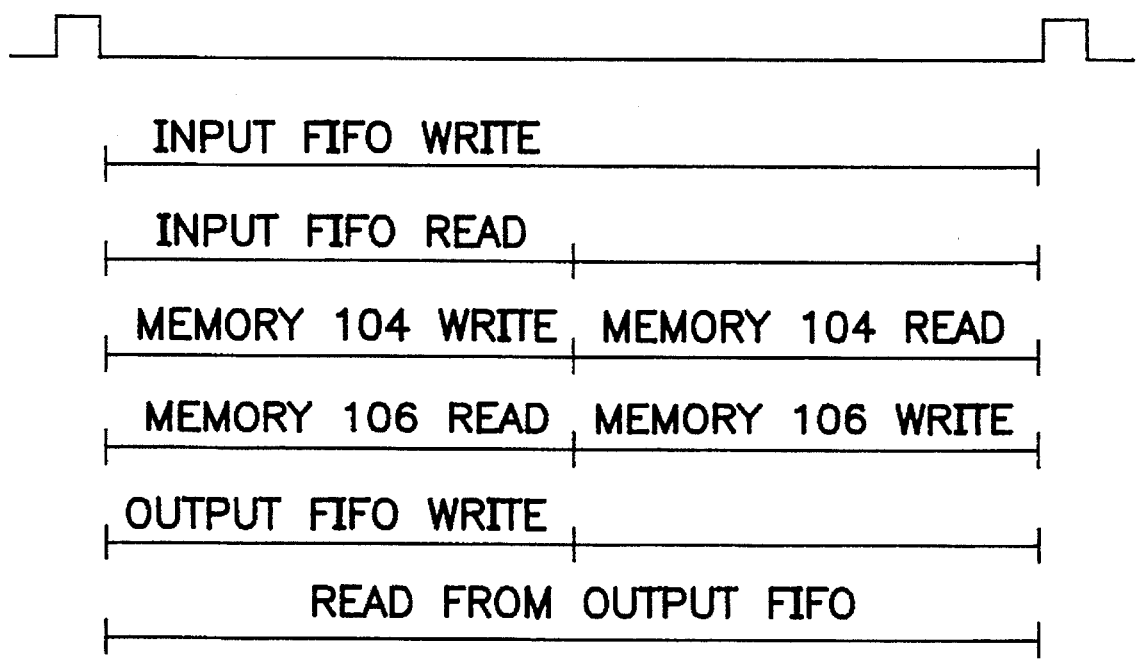
FIG. 14 is a timing diagram which is useful for understanding the operation of the present invention.

FIG. 14 shows a timing diagram illustrating the operation of a processing cell 96 as shown in FIG. 12. The digital input signal is written into input FIFO 100 during one full processing cycle. An entire input frame of information is read from input FIFO 100 in only one half of a processing cycle, since the information is read at twice the processing rate of the input video information signal which was stored in from FIFO 100. Following processing in resampling filter 21, the resampled signal information enters transpose memory 102 and is written to memory 104. In the second half of a processing cycle, signal information is read from memory 104 for feedback to resampling filter 21. In this way, both horizontal and vertical signal resampling takes place.

Also during the first half of a processing cycle, resampled signal information is read from memory 106 and written to output FIFO 108. During the second half of a processing cycle, resampled signal information is written to memory 106. Finally, during a full processing cycle information stored in output FIFO 108 is read to produce the resampled final output signal.

FIG. 15 illustrates the operation of system 90 as a four channel system. The operation of each processor cell $96_1$–$96_4$ is illustrated over a single processing cycle (i.e. single frame) for each line and column of signal information being processed and stored. The input and output frame FIFOs 100 and 108 are illustrated only once as their operation is the same for each of the processor cells.

The signal information written to input frame FIFO 100 is written over the full processing cycle at a signal rate designated as 1×. In an exemplary embodiment using an approximately 75 MHz HDTV input signal, the 1×sampling rate would be 20 MHz for each processor cell $96_1$ –$96_4$. Once an input frame FIFO contains a frame of information (after one processing cycle), the information can be read out at twice (2×) the clock rate during the first half of the processing cycle. In an exemplary embodiment, horizontal processing takes place during the first half of the processing cycle and vertical processing takes place during the second half of the processing cycle. This provides all of the information for processing so that both horizontal and vertical resampling can take place during a single processing cycle (frame interval). FIG. 15 illustrates only a portion of the frame information being processed. The number of actual lines and columns processed depends upon the frame size of the final output signal. For example, when converting to a 720×483 SDTV signal, the final output image would be 720 lines by 483 columns.

It can be seen from the illustration in FIG. 15 that the allocation of lines for horizontal processing are distributed vertically so that the output from processors $96_1$, $96_2$, $96_3$, $96_4$ during each processing cycle provides information for vertical columns. For example, processing cell $96_1$ processes lines 1, 5, 9 and so on in increasing increments of 4. Processing cell $96_2$ begins processing with line 2, then line 6 and so on, also in increasing increments of 4. Processing cell $96_3$ begins processing with line 3, then line 7 and so on. Processing cell 964 begins processing with line 4, then line 8 and so on. After each line is processed, the resulting information stored in memory 104 (for input back to resampling filter 21 for vertical resampling) is oriented with the vertical column information in a horizontal format orientation as shown in FIG. 6 to accommodate a resampling filter 21 which processes horizontal. In this way, as each processing cycle is complete, signal information is orientated suitably to begin processing the vertical signal information during the second half of the processing cycle.

Figure 16B:
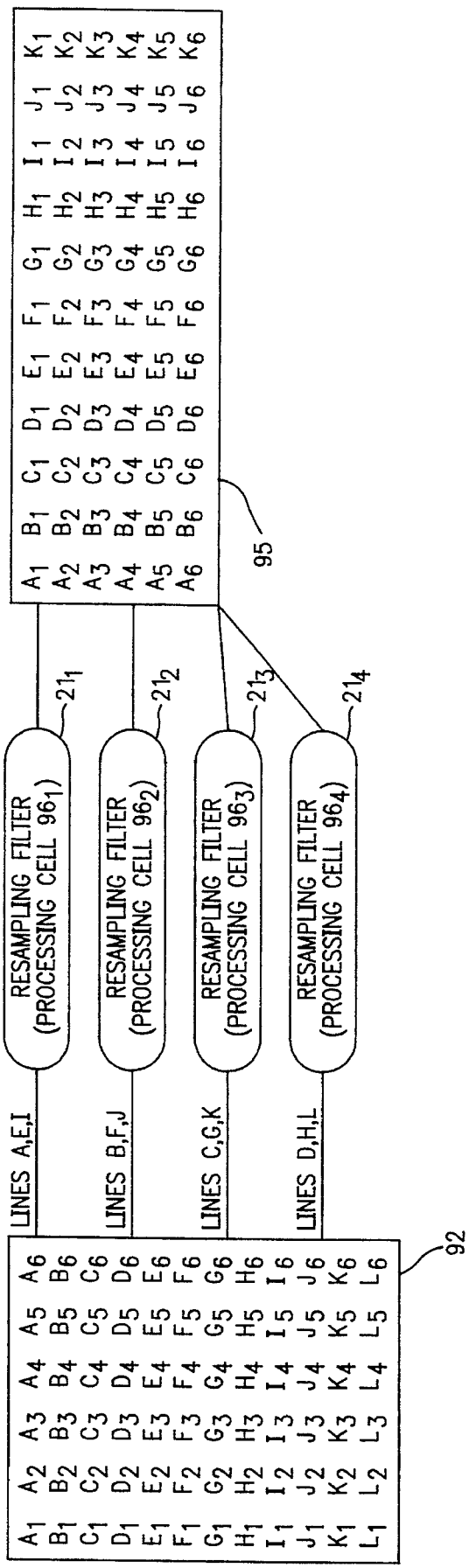
FIG. 16B is a block diagram of a parallel processing architecture in accordance with an exemplary embodiment of the present invention showing the transposition of row and column information during processing.
Figure 16A:
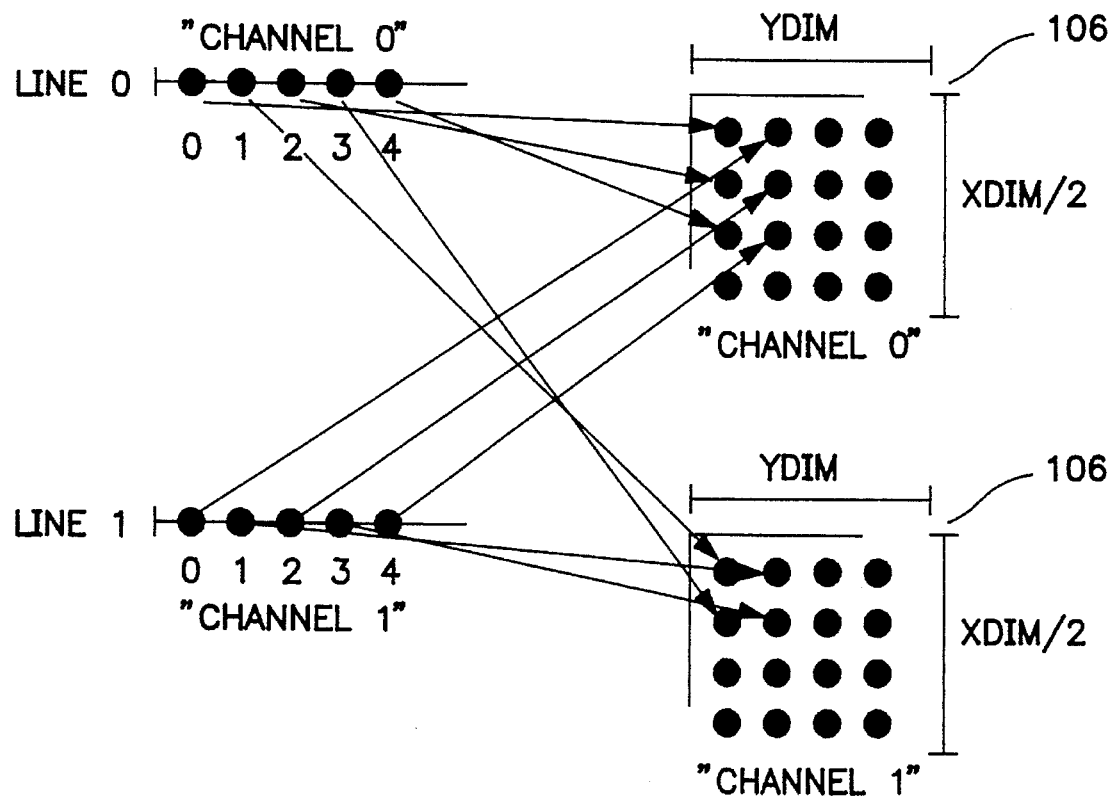
FIG. 16A is a memory mapping for a two channel system configuration in accordance with the present invention.

FIG. 16A illustrates the memory mapping for a two channel configuration. In the two channel configuration, the horizontal line is divided for processing by two processors, "Channel 0" and "Channel 1" each with its own memory 106. Every other sample is written to a different one of the two memories 106. As shown in FIG. 16A, an illustrative line 0 is shown as it is processed in a Channel 0 processor and an illustrative line 1 is processed in a Channel 1 processor.

As line 0 is processed, samples 0, 2 and 4 are written to column 1 of the Channel 0 memory 106. Samples 1 and 3 of line 0 are written to column 1 of the Channel 1 memory 106. Line 1 in the Channel 1 processor are written as follows. Samples 0, 2 and 4 are written to column 2 of Channel 0 memory 106 while samples 1 and 3 are written to column 2 of Channel 1 memory 106. Accordingly, it can be seen that each line or row of the respective Channel 0 and Channel 1 memories now contains samples corresponding to the same ydim position of the input line being processed.

In horizontal processing, switching matrix (such as switching matrix ½ in FIG. 17A) is needed to write complete columns to a single memory 106 while complete rows must be written during vertical processing. To accomplish this, the data read from the second, line FIFO 108 (for a two channel configuration) must be delayed by a single clock cycle. In a four channel system, a delay of one clock cycle is needed for each additional channel (i.e. between the second and third channels and between the third and fourth channels). Table 5 illustrates the data sequence for a two channel configuration and Table 6 illustrates the data sequence for a four channel configuration.

TABLE 5

| | | | | | | | |
|---|---|---|---|---|---|---|---|
| sample generated from Channel 0 | 0a | 1a | 2a | 3a | 4a | 5a | 6a |
| sample written to Channel 0 memory | 0a | 0b | 2a | 2b | 4a | 4b | 6a |
| sample generated from Channel 1 | | 0b | 1b | 2b | 3b | 4b | 5b |
| sample written to Channel 1 memory | | 1a | 1b | 3a | 3b | 5a | 5b |

TABLE 6

| | | | | | | | | |
|---|---|---|---|---|---|---|---|---|
| generated from Channel 0 | 0a | 1a | 2a | 3a | 4a | 5a | 6a | 7a |
| written to Channel 0 memory | 0a | 0b | 0c | 0d | 4a | 4b | 4c | 4d |
| generated from Channel 1 | | 0b | 1b | 2b | 3b | 4b | 5b | 6b |
| written to Channel 1 memory | | 1a | 1b | 1c | 1d | 5a | 5b | 5c |
| generated from Channel 2 | | | 0c | 1c | 2c | 3c | 4c | 5c |
| written to Channel 2 memory | | | 2a | 2b | 2c | 2d | 6a | 6b |
| generated from Channel 3 | | | | 0d | 1d | 2d | 3d | 4d |
| written to Channel 3 memory | | | | 3a | 3b | 3c | 3d | 7a |

FIG. 16B shows an example of the memory configuration of input frame 92 (shown in FIG. 11) and intermediary output frame 95. Input frame 92 has a configuration of rows labeled A–J and columns labels 1–6. The rows of samples, i.e. $A_1, A_2, \ldots A_6; B_1, B_2, \ldots B_6$, etc., enter respective resampling filters $21_1$–$21_4$ of respective processing cells $96_1$–$96_4$ to carry out horizontal processing. Resampling filter $21_1$ of processing cell $96_1$ processes lines A, E and I. Resampling filter $21_2$ of processing cell $96_2$ processes lines B, F and J. Resampling filter $21_3$ of processing cell $96_3$ process lines C, G, K. Resampling filter $21_4$ of processing cell $96_4$ processes lines D, H, L. Following processing, a transposition occurs whereby the horizontal row information is converted into vertical column information and is stored in memory 104 as an intermediary output frame 95. Thus row 1 of intermediary output frame 95 now contains samples A1, B1, C1, ... L1; while row 2 contains samples A2, B2, C2, ... L2., etc.

The information shown stored as intermediary output frame 95 is then fed back into the appropriate resampling filter 21 of each processing cell $96_1$–$96_4$ to complete processing in the vertical dimension.

In an exemplary embodiment, the processing for the vertical dimension is carried out through resampling filters $30_1$–$30_4$ of processing cells $96_1$–$96_4$ by processing the vertical information in the horizontal configuration (orientation) shown as intermediary output frame 95. Thus, by transposing the resampled information following horizontal resampling, the digital input signal information is oriented in a format so that vertical resampling processing can take place in the processing cells $96_1$–$96_4$. Following the vertical resampling processing, the transposed memory scheme of the present invention transposes the memory back to the original orientation of the horizontal and vertical dimensions for output as the digital output signal.

The transposed memory scheme is carried out by linking the plurality of processing cells 96 which carry out the parallel processing of the digital input signal. The transposed memory uses a switching matrix 100 (FIG. 13) to allow communication among the processing cells which are being used in order to carry out the processing of all information and recreate the original horizontal and vertical dimension orientation.

Figure 17A:
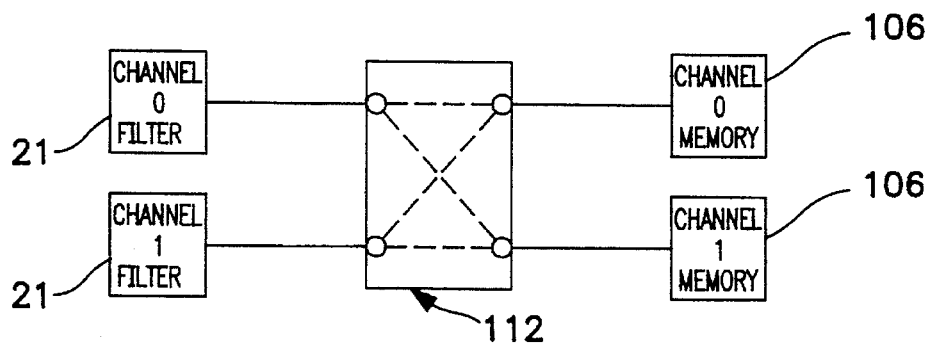
FIG. 17A is a block diagram of a two channel switching matrix connection.
Figure 17B:
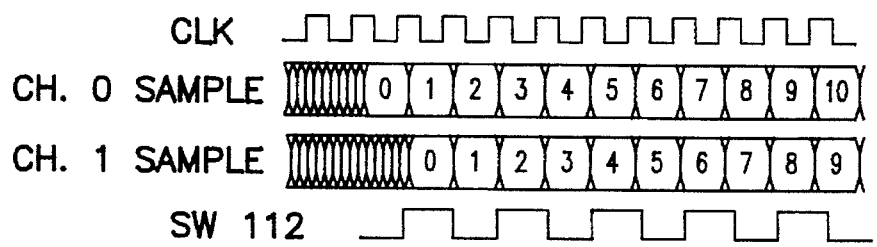
FIG. 17B is a timing diagram which is useful for describing the matrix shown in FIG. 7A.

FIG. 17A shows an example of a two channel system having single switch connected between two resampling filters 21 and two memories 106. FIG. 17b illustrates the timing diagram for switching between the two memories 106 by the resampling filters 21. Switch 112 switches at one half of the processing cycle, storing information in memory 106 of a first processing cell to memory 106 of a second processing cell for each of the respective resampling filters 21. This provides the orientation of information necessary to carry out the vertical processing in the respective resampling filters 21 and then for the conversion of current the horizontal processed signals back to the original horizontal/vertical orientation (with the new resampled format) following vertical processing.

For the four channel network shown in FIG. 18a, switches 114, 116, 118 and 40 (which are identical and equivalent to switch 112) provide for switching resampled signal information into memories 106 according to the timing diagram shown in FIG. 18b.

In an exemplary embodiment, the memory devices used for memories 104 and 106 are static RAMs. Also in an exemplary embodiment, switches such as switch 112 used in switching matrix 100 are High Speed CMOS Bus Exchange Switches made by Quality Semiconductor, Inc. under part number QS32383. Each semiconductor switch 112 consists of a set of five, four point zero delay switches that each pass the sample data or pass the output, depending upon the state of the control signal for the particular semiconductor switch 112.

Figure 19:
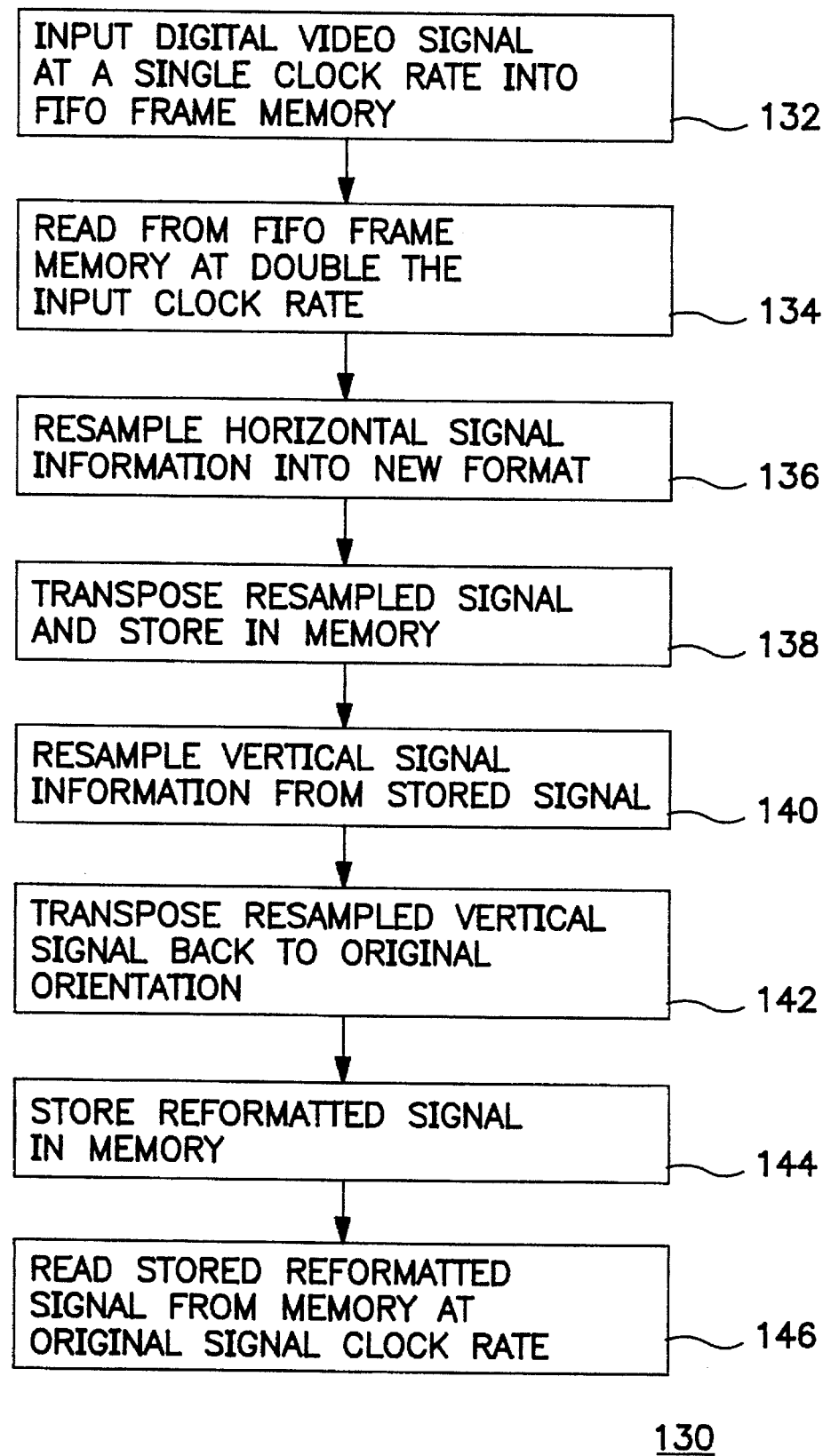
FIG. 19 is a flow chart showing a method of operation of an exemplary embodiment of the present invention.

FIG. 19 shows a flow chart 130 illustrating the process of an exemplary embodiment of the present invention. This flowchart diagram is provided to illustrate how the process may be implemented using a general purpose computer, such as computer 34 shown in FIG. 3. In block 132 the input digital video signal is entered into a FIFO frame memory at a single processing rate. The input digital video signal is read from FIFO frame memory at double the input processing rate in step 134. Input digital video signal undergoes horizontal resampling in step 136 and is stored in transpose memory in step 138. Storage in transpose memory is such that the orientation allows for processing of the vertical dimension signal information.

The transposed signal is resampled in the vertical dimension at step 140. The vertically resampled signal information is then stored in memory at step 142 in the original orientation of horizontal and vertical signal information at step 144. Finally, the stored, horizontally and vertically reformatted signal is read from memory at the original processing rate at step 146.

Address Generation

The static memory address is manipulated along with the matrix switch control for the transposition operation. The memory size in an exemplary embodiment is 512K. This size corresponds to an address length of 19 bits. The 512K memory was chosen to allow for a maximum image dimension of 2K×2K in an exemplary system. Other memory sizes and image dimensions could also be used, with appropriate adjustments.

The 19 bit address bits are split into X and Y coordinates to realize the 2 dimensional nature of the memory. That is, the number of bits that are allocated for each coordinate is determined by the size of the image.

A 22 bit word that represents the X and Y processing dimension (4 bits for each dimension) is downloaded to a memory control through a serial line in an exemplary embodiment. These dimensions specify the required size of the memory for the transposition operation and is broken up as: word[21:0]=ydim[10:0]∥ xdim[10:0] where "∥" represents concatenation.

The xdim parameter takes the value of the output format active horizontal size. This is used because by the time the sample data reaches memory 104, it has been converted to the output horizontal size which makes the input size irrelevant for memory allocation. The ydim parameter takes the value of the larger of the input or output format active vertical size, so that the total of the input lines is written to memory 104 during horizontal processing while the total number of output lines is written to memory 106 during vertical processing. Accordingly, the larger of the input or output number of lines is required for allocating the address bits.

The addressing system consists of four individual counters (not shown) for the memory addressing requirements. That is, there is a set of X and Y counters for each memory (106 and 104). These memory counters are referred to as xa, ya, xb, and yb.

The operation of the memory counters is different for the horizontal and vertical processing outputs. The two modes are described with respect to Table 7 (where nch=the number of processing channels in the system: 4 for Y(luminance), 2 for C(chrominance)).

TABLE 7

Horizontal Processing 1. write to memory bank 1
   yb: reset at the beginning of each line
       count 0 to xdim/nch, incrementing by
       1 every nch cycles
   xb: reset at the beginning of each
       field/frame
       upper bits: count 0 to ydim,
           incrementing by 1 at the beginning
           of each line
       lower bits: count 0 to nch–1,
           incrementing the lower bits by 1
           every cycle, then cycle back to 0 and
           continue incrementing
   Example:
   1st line: 0,1, . . . nch–1,0,1, . . . ,nch–1, . . .
   2nd line: nch,nch+1, . . . 2nch–1,nch,nch+1, . . .
       2nch–1, . . .
   3rd line: 2nch,2nch+1, . . . 3nch–1,2nch,2nch+1, . . .
       3nch–1, . . .
   last line: ydim,ydim+1, . . . ydim+nch–1,ydim,
       ydim+1, . . . ydim+nch–1, . . .
2. read from memory bank 0
   xa: reset at the beginning of each field/frame
       and after "end of count"
       count 0 to xdim, incrementing by 1 every
       cycle
   ya: reset at the beginning of each field/frame
       count 0 to ydim/nch, incrementing by 1
       after every "end of count" for xa Vertical Processing 1. read from memory bank 1
   xb: reset at the beginning of each line
       count 0 to ydim, incrementing by 1 every
       cycle
   yb: reset at the beginning of each field/frame
       count 0 to xdim/nch, incrementing by 1 at
       the beginning of each line
2. write to memory bank A
   ya: reset at the beginning of each line
       count 0 to ydim/nch, incrementing by 1
       every nch cycle
   xa: reset at the beginning of each field/frame
       upper bits: count 0 to xdim, incrementing
           by 1 at the beginning of each line
       lower bits: count 0 to nch–1, incrementing
           the lower bits by 1 every cycle
   Example:
   1st column: 0,1, . . . nch–1,0,1, . . . nch–1, . . .
   2nd column: nch,nch–1, . . . 2nch–1,nch,nch_1, . . .
       2nch–1, . . .
   3rd column: 2nch,2nch+1, . . . 3nch–1,2nch,
       2nch_1, . . . 3nch–1, . . .

TABLE 7-continued last column: xdim,xdim+1, . . . xdim+nch–1,
    xdim,xdim+1, . . . ,xdim+nch–1

In write mode, the memory counters must be offset from one another by a single clock cycle. That is, the counters for Channel 1 (xb, yb) start one clock cycle later than the counters for Channel 0 (xa, ya), etc. This is accomplished by delaying the act_v signal, which starts the counters, by the channel number.

In write mode, the lower bits of xa and xb are controlled separately from the upper bits. While the upper bits are reset at the beginning of each line by the v_start signal), the lower bits are reset every nch cycles. In an exemplary embodiment a separate channel counter is run in parallel with the address counters. It counts from 0 to nch-1 and continues after resetting to 0. This is implemented by generating a separate reset signal for the lower bits.

This channel counter is also used to generate switching matrix control signals, such as the control signal illustrated for switch 112 in FIG. 17B and switches 114, 116, 118 and 120 in FIG. 18B.

In an exemplary embodiment, "end of count" decodes are not implemented unless they are necessary, to save space. The counter value is compared to the processing size parameter which can require a large amount of logic.

In read mode, the "end of count" decode is used for the xb count for edge extension. During vertical processing, data is read from memory 104 and fed back to the resampling filters 21 for vertical resizing.

During horizontal processing, data from memory 106 is read and then fed to the output frame FIFO 108. The last sample that is read from each line must be immediately followed by the first samples in the next line. To facilitate this, and "end of count" decode is used for the xb address to detect the end of each line.

In write mode, the "end of count" decodes need not be implemented for any of the memory counters. Although this will cause "garbage data" to be written to memory, this data is never accessed. To prevent overflow, the memory counters must be stopped before the bits run out. The ya and yb memory counters do not require end of count decodes in either read or write modes. Of course, the overflow protection must again be implemented.

In an exemplary embodiment, a separate enable signal is generated to increment each of the memory counters. In write mode, the enables go active at the end of each channel count. This is how the ya and yb memory counters increment every nch cycles. However, a separate (stopx) signal is generated to prevent the upper bits of xa and xb from incrementing at this point. These upper bits increment by one at the beginning of each line in an exemplary embodiment. This is accomplished by disabling the stopx signal once at the beginning of each line so that once the lower bits reach a value of nch, the upper bits will automatically increment by 1. In read mode, the enable signal simply allow the xb counter to increment every cycle while the yb counter increments at the beginning of each line.

The ya, xa group increments differently than the yb, xb group in their respective read modes. When reading from memory 104, the sample data is fed back to the resampling filter 21 for vertical processing. The sample data must be read in the same fashion as the sample data that is provided fro the input frame FIFO 100 during horizontal processing. That is, a new column is read starting with each v_start pulse.

With this exemplary implementation, there are portions of time where no sample data is being read from memory. It is still necessary, however, to handle certain features of the processing (most notably, edge extension). This is not the case for the read out of memory 106. The data that is read from memory 106 is sent directly to the output frame FIFO 108 which does not have the same restrictions during processing.

The memory addressing scheme could limit the range of output formats that could be handled by the exemplary processing system. For instance, in a 1125*i* (interlaced) to 720*p* (progressive) conversion, a field of 1920×518 is converted to a frame of 1280×720. In this mode, 518 v_start pulses are generated to signify each input line. However, on the output, 710 lines are needed. So, if a single line is read after every v_start pulse, there would not be enough time to read all 720 lines from the memory. Therefore, the read is executed in a single burst with one line immediately following the other.

An enable signal is generated to signal an output formatter (not shown), when the sample data is being provided from memory. The enable signal toggles low to high with the first sample in the frame in an exemplary embodiment.

To prevent FIFO 108 from crashing, the write may be stopped by toggling the signal low before FIFO 108 is filled up. The position of this falling edge does not have to occur at the exact position of the last sample, but must only occur after it is written. Circuitry to implement an exact decode could take up a considerable amount of space so an estimate can be made using circuits which accept only the upper 6 bits of ydim.

During horizontal processing, the dimensions of the sample data that is written to memory bank 104 is xdim× ydim/nch. ydim/nch lines are written to each memory 104 because the total number of lines, ydim, is distributed across the nch processing channels. Similarly, xdim/nch×ydim samples are written to memory 106 during vertical processing.

The 19 address bits must be allocated to accommodate this memory allocation scheme. Bits 18–11 are reserved for the lower 8 bits of the Y address while bits 7–0 are reserved for the lower 8 bits of the X address. This leaves three bits, 10–8 which are allocated based on the processing dimensions.

This memory allocation scheme is necessary to allow for different combination of X and Y sizes. The 512K memory allows for image sizes of up to 2K×2K, but 8 processing channels would be needed (512K×8=2K× 2K). With a 4 channel configuration, images sizes of up to 2K×1K (or 1K×2K) can be processed. Table 8 shows how bits 10–8 of the memory address are allocated in an exemplary embodiment.

TABLE 8

Memory Bank 0
if (xdim ≦ 255)
  X address is allocated 8 bits: xa[7:0] =
    addra[7:0]
  Y address is allocated 11 bits: ya[10:0] =
    addra[10:8] ‖ addra[18:11]
if (256 ≦ xdim ≦ 511)
  X address is allocated 9 bits: xa[8:0] =
    addra[8:0]
  Y address is allocated 10 bits: xa[9:0] =
    addra[10:9] ‖ addra[18:11]
if (512 ≦ xdim ≦ 1023)
  X address is allocated 10 bits: xa[9:0] =
    addra[9:0]

TABLE 8-continued

Y address is allocated 9 bits: ya[8:0] =
    addra[10] ‖ addra[18:11]
if (xdim ≦ 1024)
  X address is allocated 11 bits xa[10:0] =
    addra[10:0]
  Y address is allocated 8 bits ya[7:0] =
    addra[18:11]
Memory Bank 1
if (ydim ≦ 255)
  X address is allocated 8 bits: yb[7:0] =
    addrb[7:0]
  Y address is allocated 11 bits: yb[10:0] =
    addrb[10:8] ‖ addrb[18:11]
if (256 ≦ ydim ≦ 511)
  X address is allocated 9 bits: xb[8:0] =
    addrb[8:0]
  Y address is allocated 10 bits: yb[9:0] =
    addrb [10:9] ‖ addrb[18:11]
if (512 ≦ ydim ≦ 1023)
  X address is allocated 10 bits: xb[9:0] =
    addrb[9:0]
  Y address is allocated 9 bits: Yb[8:0] =
    addrb[10] ‖ addrb[18:11]
if (ydim ≦ 1024)
  X address if allocated 11 bits xb[10:0] =
    addrb[10:0]
  Y address is allocated 8 bits Yb[7:0] =
    addrb[18:11]
where addra = 19 bit address of memory bank 0
where addrb = 19 bit of address of memory bank 1

For example, for HDTV 1920×518, 11 bits would be allocated for the X address and 8 bits would be allocated for the Y address of memory 106. For memory 104, 10 bits are reserved for the X address and 9 bits are reserved for the Y address.

Address bits [18:11] and [7:0] are simply taken from the lower 8 bits of the y and x memory counters respectively. However, additional logic may be required to multiplex bits [10:8] based on the processing dimensions. Simply, adding this additional level of logic to the output of the counters may violate timing requirements. So, a "look ahead" incrementer is implemented in the system. That is, the values for bits [18:11] must be calculated the cycle before they are needed and registered.

This is accomplished by looking at the 8 address bits that are always allocated for the counter output. When all 1's are detected, bit 8 must change state on the following clock cycle. The same scheme is used for bits 9 and 10 and may be implemented as T flip-flops. So, 11 bits are always available from each of the 4 counters but are not all used at the same time.

Figure 20:
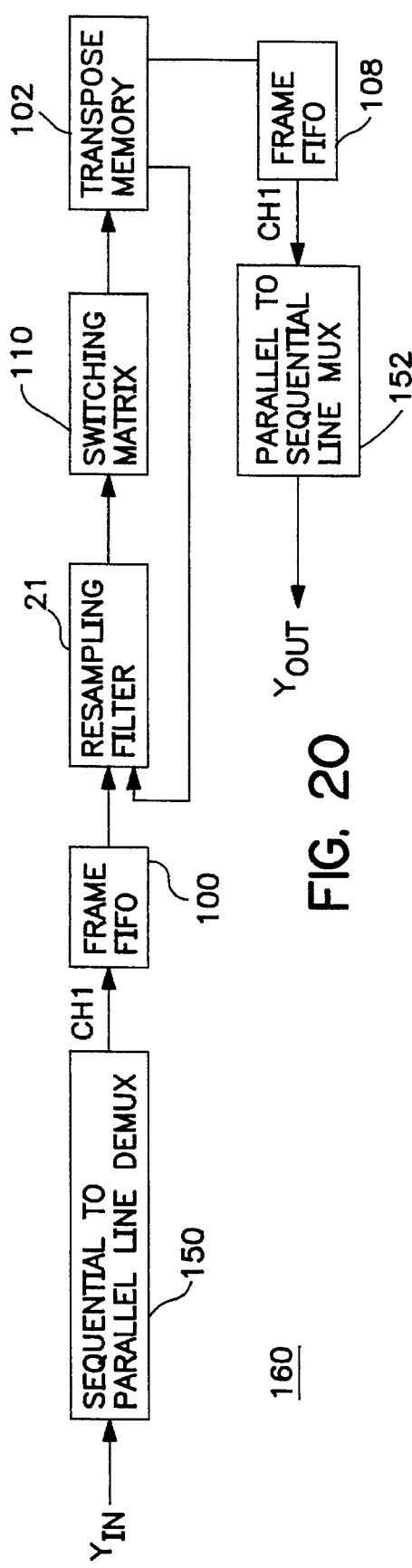
FIG. 20 is a block diagram of a parallel processing architecture which receives parallel line information as its input and provides parallel line information as its output.

There shown in FIG. 20 a system 160 for taking parallel sample data in and outputting parallel line sample data. In system 160, an input signal is fed into sequential to parallel line demultiplexer 150. Sequential to parallel line demultiplexer 150 and divides parallel sample input data into separate parallel channels. FIG. 20 illustrates a single channel being processed. Each additional channel following output from sequential to parallel line demultiplexer 150, enters a processing cell, similar to that described for channel 1.

After leaving sequential to parallel line demultiplexer 150 and entering sample data frame FIFO 108, sample data enters resampling filter 21 where the horizontal resampling takes place. The resampled signal enters switching matrix 110 prior to entering transpose memory 102. The transposition takes place so that vertical processing can be carried out. The transposed data leaves transpose memory 102 and enters resampling filter 21. At the same time, processed information enters frame FIFO 108 where it is later combined with the vertically resampled data, prior to entering parallel to sequential line multiplexer 152. A final output is generated from parallel to sequential line multiplexer 152.

Since system 160 is designed to take parallel line data in and output parallel line data, each channel demultiplexed by sequential to parallel line demultiplexer 150 contains sample data having the same x and y dimensions for both the output and input signals. Accordingly, resampling filter 21 proceeds transposed memory 102.

Figure 21:
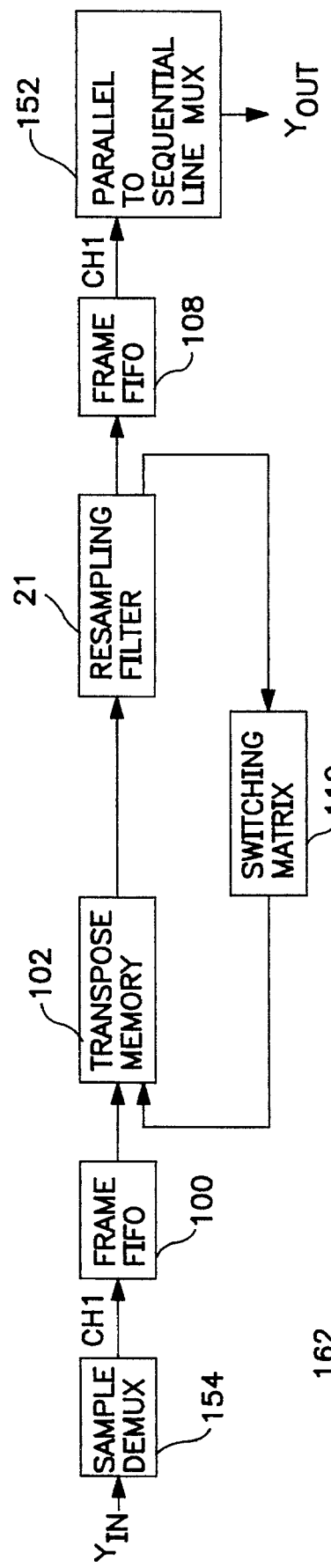
FIG. 21 is a block diagram of a parallel processing architecture taking parallel sample information in and outputting parallel line information, in accordance with the present invention.

This method keeps the data format the same (parallel line data) at the input and output frame FIFOs (100 and 108). However, this requires lines FIFOs to generate the parallel lines, which would increase the amount of the necessary hardware. When this is not required (and to reduce the hardware requirements), a sequential to parallel line conversion may be omitted as follows. Resampling system 162 shown in FIG. 21 is designed to take parallel sample data in and provide a parallel line output. The input signal enters sample demultiplexer 154. A single channel 1 is shown exiting sample demultiplexer 154 and entering frame FIFO 100. Like system 160, multiple channels (2, 4 etc.) can be generated by sample demultiplexer 154. Each channel would then enter its own processing cell similar to that described for channel 1. The sample data enters frame FIFO 100 prior to entering transpose memory 102. From transpose memory 102, the sample data enters resampling filter 21 to carry out vertical resampling. The vertically resampled data then enters switching matrix 110 in order to transpose the information for storage in transpose memory 102. Following transposition, horizontal processing can take place in resampling filter 21. Following resampling, horizontal and vertically processed information is stored in frame FIFO 108, prior to parallel to sequential line multiplexing in parallel to sequential line multiplexer 152. The final output signal leaves parallel to sequential line multiplexer 152.

Since parallel sample data is input and parallel line data is output, the input signal samples are incremented in the x dimension depending upon the number of channels in system 162. For example, if channel 162 has four channels, the first line generated by sample demultiplexer 154 would include sample 0, 4, 8, etc. The second channel would include samples 1, 5, 9, etc. The third channel would include samples 2, 6, 10, etc. and the fourth channel would include samples 3, 7, 11, etc.

The output channels, following resampling and transposition, would be comprised of lines with the appropriate x dimensions (i.e. 0, 1, 2, 3, 4, etc.). Each channel would be oriented in this fashion, prior to parallel to sequential line multiplexing.

It will be understood, that system 160 could also be reconfigured to take parallel line information in and output parallel sample data. In order to do so, switching matrix 110 would not be active for vertical processing and a parallel to sequential line multiplexer 152 would be substituted with a sample multiplexer (not shown). For such an example, the input information would be oriented as described with respect to system 160. The output signal information, however, would be oriented in the same manner as the input signal described for system 162.

While particular embodiments of the present invention are disclosed herein, it is not intended to limit the invention to such disclosure, and changes and modifications may be incorporated and embodied within the scope of the following claims:

What is claimed:

1. A video format converter for converting a digital input signal having a first vertical sample size per unit length and a first horizontal sample size per unit length to a digital output signal having a second vertical sample size per unit length and a second horizontal sample size per unit length comprising:

a) a first memory means for storing said digital input signal;

b) a plurality of processing cells, each having:

i) horizontal resampling means for converting said first horizontal sample size per unit length of said digital input signal into said second horizontal sample size per unit length during a first time period, the horizontal resampling means comprising a sampling filter, ii) second memory means for storing said digital input signal having said second horizontal sample size following said conversion in said horizontal resampling means, iii) vertical resampling means for converting said first vertical sample size per unit length of said digital input signal having said second horizontal sample size into said second vertical sample size per unit length during a second time period, and iii) third memory means for storing said digital input signal having said second vertical sample size following conversion in said vertical resampling means; and c) fourth memory means for storing said digital input signal having said second vertical sample size from each of said plurality of processing cells, said stored signal constituting said digital output signal.

2. A video format converter for converting a digital input signal having a first vertical sample size per unit length and a first horizontal sample size per unit length to a digital output signal having a second vertical sample size per unit length and a second horizontal sample size per unit length comprising:

a) a first memory means for storing said digital input signal;

b) a plurality of processing cells, each having:

i) horizontal resampling means for converting said first horizontal sample size per unit length of said digital input signal into said second horizontal sample size per unit length during a first time period, ii) second memory means for storing said digital input signal having said second horizontal sample size following said conversion in said horizontal resampling means, iii) vertical resampling means for converting said first vertical sample size per unit length of said digital input signal having said second horizontal sample size into said second vertical sample size per unit length during a second time period, and iii) third memory means for storing said digital input signal having said second vertical sample size following conversion in said vertical resampling means; and c) fourth memory means for storing said digital input signal having said second vertical sample size from each of said plurality of processing cells, said stored signal constituting said digital output signal;

wherein for each of said processing cells, said horizontal resampling means and said vertical resampling means comprise a single resampling processor means.

3. A video format converter in accordance with claim 2 further comprising a horizontal to vertical switching means connecting each of said processing cells for transposing said digital input signal having said second horizontal sample size to a vertical format for storage in said second memory means.

4. A video format converter in accordance with claim 3 further comprising a vertical to horizontal switching means connecting each of said processing cells for transposing said digital input signal having said second vertical sample size to a horizontal format for storage in said third memory means.

5. A video format converter in accordance with claim 4 wherein said horizontal to vertical switching means and said vertical to horizontal switching means comprise a single switching means.

6. A video format converter in accordance with claim 5 wherein said plurality of processing cells ranges from two to eight.

7. A video format converter in accordance with claim 6 wherein said digital input signal is read from said first memory means at twice the rate at which said digital input signal is written to said first memory means.

8. A video format converter in accordance with claim 7 wherein said digital output signal is read from said fourth memory means at one half the rate at which said digital input signal having said second vertical sample size from each of said plurality of processing cells is written to said fourth memory means.

9. A video format converter in accordance with claim 4 wherein said digital input signal has a parallel line orientation and wherein said digital output signal has a parallel line orientation further comprising
 a) a sequential to parallel line demultiplexer for demultiplexing said parallel line oriented digital input signal prior to storing said digital input signal in each of said first memory means; and
 b) a parallel to sequential line multiplexer for multiplexing each of said signals stored in each of said fourth memory means to produce said digital output signal in said parallel line orientation.

10. A video format converter in accordance with claim 4 wherein said digital input signal has a parallel line orientation and wherein said digital output signal has parallel sample orientation further comprising:
 a) a sequential to parallel line demultiplexer for demultiplexing said parallel line oriented digital input signal prior to storing said digital input signal in each of said first memory means; and
 b) a parallel sample multiplexer for multiplexing each of said signals stored in each of said fourth memory means to produce said digital output signal in said parallel sample orientation.

11. A video format converter in accordance with claim 4 wherein said digital input signal has a parallel sample orientation and where said digital output signal has a parallel line orientation, further comprising:
 a) a parallel sample demultiplexer for demultiplexing said parallel sample oriented digital input signal prior to storing said digital input signal in each of said first memory means; and
 b) a parallel to sequential line multiplexer for multiplexing each of said signals stored in each of said fourth memory means to produce said digital output signal in said parallel line orientation.

12. A method for processing horizontal and vertical sample information of a digital input signal having at least one sample, said digital input signal sample having a plurality of vertical columns of a first vertical sample size per unit length, and a plurality of horizontal lines of a first horizontal sample size per unit length, to produce a sampled data digital output signal, said digital output signal having a plurality of vertical columns of a second vertical sample size per unit length and a plurality of horizontal lines of a second horizontal sample size per unit length, comprising the steps of:
 a) reading a first horizontal line of said digital input signal from a first memory device;
 b) storing said first horizontal line of said digital input signal in a second memory device as a first vertical column;
 c) repeating steps (a) and (b) for each subsequent horizontal line of said digital input signal stored in said first memory device until all of said horizontal lines from said first memory device have been stored in said second memory device as vertical columns, as an intermediate digital signal;
 d) reading a first horizontal line of said intermediate digital signal from said second memory;
 e) processing said first horizontal line of said intermediate digital signal;
 f) storing said first horizontal line of said intermediate digital signal in said first memory device as a first horizontal line of said digital output signal; and
 g) repeating steps (d), (e) and (f) for each subsequent horizontal line of said intermediate digital signal stored in said second memory device until said processing is complete and all of said horizontal lines from said second memory device have been stored in said first memory device as said digital output signal.

13. A method of generating an address of a predetermined number of bits for representing the horizontal and vertical components of a digital output signal when processing horizontal and vertical sample information of a digital input signal to produce said digital output signal having at least one sample, said digital output signal sample having a vertical component of a vertical sample size per unit length and a horizontal component of a horizontal sample size per unit length comprising the steps of:
 a) allocating a first portion of said predetermined number of bits for use in representing said horizontal component of said digital output signal;
 b) allocating a second portion of said predetermined number of bits for use in representing said vertical component of said digital output signal;
 c) determining if either of said horizontal component or said vertical component require additional bits to represent said size of said respective horizontal or vertical component;
 d) allocating a third portion of said predetermined number of bits for use in representing either said horizontal component or said vertical component as determined in step (c).

14. A method of generating an address of a predetermined number of bits for representing the horizontal and vertical components of a digital output signal as recited in claim 13 wherein said address is comprised of 19 bits, said first portion of said predetermined number of bits equals eight bits, said second portion of said predetermined number of bits equals eight bits and said third portion of said predetermined number of bits equals three bits.

* * * * *